(12) United States Patent
Endo

(10) Patent No.: US 7,773,311 B2
(45) Date of Patent: Aug. 10, 2010

(54) ZOOM LENS AND IMAGE PICKUP APPARATUS INCLUDING THE SAME

(75) Inventor: Hiroshi Endo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/354,775

(22) Filed: Jan. 16, 2009

(65) Prior Publication Data

US 2009/0180199 A1    Jul. 16, 2009

(30) Foreign Application Priority Data

Jan. 16, 2008    (JP) .............................. 2008-006535

(51) Int. Cl.
*G02B 15/14* (2006.01)
(52) U.S. Cl. ...................... 359/686; 359/682
(58) Field of Classification Search ................. 359/686, 359/676, 682, 684, 695, 752, 761
See application file for complete search history.

(56) References Cited

U.S. PATENT DOCUMENTS

| 5,517,361 | A | 5/1996 | Inadome et al. |
| 5,576,890 | A | 11/1996 | Tanaka |
| 5,710,669 | A | 1/1998 | Endo |
| 7,184,221 | B2 | 2/2007 | Makoto |
| 2004/0125462 | A1* | 7/2004 | Misaka ........................ 359/684 |
| 2006/0139767 | A1* | 6/2006 | Lee et al. ..................... 359/684 |

* cited by examiner

*Primary Examiner*—Alicia M Harrington
(74) *Attorney, Agent, or Firm*—Canon USA Inc IP Div

(57) ABSTRACT

A zoom lens includes a first lens unit having a negative refractive power, a second lens unit having a positive refractive power, and a rear unit including one or more lens units, which are arranged in order from the object side to the image side. The zoom lens performs zooming by changing distances between the first, second, and rear lens units. A first focusing unit and a second focusing unit which move independently of each other during focusing are provided. The first and second focusing units are adequately set.

10 Claims, 16 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens. The present invention is suitable for, for example, imaging systems for digital cameras, video cameras, and silver-halide film cameras.

2. Description of the Related Art

A negative-lead zoom lens is known in which a lens unit having a negative refractive power is disposed at a position closest to the object side. The negative-lead zoom lens has a relatively small close-up shooting distance, and the field angle and can be relatively easily increased. In addition, the back focus can be easily increased. Therefore, the negative-lead zoom lens is often used as a wide field angle imaging lens.

A zoom lens including at least four lens units, which are a lens unit having a negative refractive power, a lens unit having a positive refractive power, a lens unit having a negative refractive power, and a lens unit having a positive refractive power arranged in order from the object side, is known as a negative-lead zoom lens (U.S. Pat. Nos. 5,517,361, 7,184,221, and U.S. Pat. No. 5,710,669).

U.S. Pat. No. 5,517,361 describes a zoom lens including a first lens unit having a negative refractive power, a second lens unit having a positive refractive power, a third lens unit having a negative refractive power, and a fourth lens unit having a positive refractive power, which are arranged in order from the object side to the image side. The zoom lens performs zooming by changing the distances between the lens units and performs focusing by moving the third lens unit and the fourth lens unit.

U.S. Pat. No. 7,184,221 describes a zoom lens including a first lens unit having a negative refractive power, a second lens unit having a positive refractive power, a third lens unit having a negative refractive power, a fourth lens unit having a positive refractive power, a fifth lens unit having a negative refractive power, and a sixth lens unit having a positive refractive power, which are arranged in order from the object side to the image side. The zoom lens performs zooming by changing the distances between the lens units and performs focusing by moving the fifth lens unit.

U.S. Pat. No. 5,710,669 describes a zoom lens including four lens units, which are a lens unit having a negative refractive power, a lens unit having a positive refractive power, a lens unit having a negative refractive power, and a lens unit having a positive refractive power, which are arranged in order from the object side to the image side. The zoom lens performs zooming by changing the distances between the lens units. In the zoom lens, the first lens unit is divided into a front unit having a negative refractive power and a rear unit having a negative refractive power, and focusing is performed by moving the rear unit.

U.S. Pat. No. 5,576,890 describes a zoom lens including a first lens unit having a negative refractive power, a second lens unit having a negative refractive power, a third lens unit having a positive refractive power, a fourth lens unit having a negative refractive power, and a fifth lens unit having a positive refractive power, which are arranged in order from the object side to the image side. This zoom lens performs zooming by changing the distances between the lens units and performs focusing by moving the first lens unit.

Recently, there has been an increasing demand for zoom lenses for use in digital cameras in which the size of the entire lens system is small, which have a wide imaging field angle, and with which high-quality images can be captured.

In particular, chromatic aberrations, which affect the degree of color bleed or the resolution of images when the light source is a white light source, are required to be adequately corrected over the entire zooming range from the wide-angle end to the telephoto end and over the entire object distance range from infinity to a close distance.

In a negative-lead zoom lens, aberrations, in particular the chromatic aberrations, largely vary when the object distance varies.

In particular, in the negative-lead zoom lens, when the zoom ratio is increased to increase the shooting area, the chromatic aberration of magnification increases at the wide-angle end and both the chromatic aberration of magnification and the axial chromatic aberration increase at the telephoto end.

Even if the chromatic aberrations are sufficiently corrected when the object distance is infinity, the chromatic aberrations increase when the object distance is changed to a close distance. Therefore, to obtain high-quality images over the entire shooting area with a negative-lead zoom lens, it is important to reduce the variation in chromatic aberrations during focusing.

More specifically, in a high-zoom-ratio zoom lens having a normal focal length, that is, a focal length close to the dimension of an image circle (effective screen), the chromatic aberration of magnification generally occurs in the positive direction at the wide-angle end. In other words, light with an ultra-long wavelength and light with an ultra-short wavelength tend to focus at a higher image height compared to the focus position for the design wavelength.

Conversely, the chromatic aberration of magnification occurs in the negative direction at the telephoto end. In other words, light with an ultra-long wavelength and light with an ultra-short wavelength tend to focus at a lower image height compared to the focus position for the design wavelength.

In general, a zoom lens performs focusing by moving one or more of lens units included in the entire lens system along the optical direction.

In this case, the focal length of the entire lens system in the state in which an object at infinity is in focus differs from the focal length of the entire lens system in the state in which an object at a close distance is in focus.

If the focal length in the state in which an object at a close distance is in focus is smaller than the focal length in the state in which an object at infinity is in focus, the chromatic aberration of magnification for the close distance occurs in the positive direction compared to the chromatic aberration of magnification for infinity. In other words, light with an ultra-short wavelength focuses at a higher image height compared to the focus position for the design wavelength.

Conversely, if the focal length in the state in which an object at a close distance is in focus is larger than the focal length in the state in which an object at infinity is in focus, the chromatic aberration of magnification for the close distance occurs in the negative direction compared to the chromatic aberration of magnification for infinity. In other words, light with an ultra-short wavelength focuses at a lower image height compared to the focus position for the design wavelength.

To reduce the variations in aberrations during focusing, a so-called floating method is used in which a plurality of lens units are independently moved.

The floating method is effective in reducing the variations in aberrations during focusing. However, in a negative-lead zoom lens, since the lens structure is significantly asymmetric, it is difficult to adequately correct the chromatic aberrations caused when the object distance changes even when the floating method is used. Thus, it is extremely difficult to obtain high optical performance over the entire object distance range.

SUMMARY OF THE INVENTION

The present invention provides a zoom lens having a wide field angle and high optical performance over the entire zooming range.

According to an aspect of the present invention, a zoom lens includes a first lens unit having a negative refractive power; a second lens unit having a positive refractive power; and a rear unit including one or more lens units. The first lens unit, the second lens unit, and the rear unit are arranged in order from the object side to the image side. The zoom lens performs zooming by changing distances between the first, second, and rear lens units. The zoom lens also includes a first focusing unit and a second focusing unit which move independently of each other during focusing, the second focusing unit including one or more positive lenses and one or more negative lenses. The following condition is satisfied:

$$(-1)^{\Delta g} \times (\nu N2 - \nu P2) \times (-1)^{\Delta X2} > 0$$

where νN2 is an average Abbe number of one or more materials of the one or more negative lenses in the second focusing unit, νP2 is an average Abbe number of one or more materials of the one or more positive lenses in the second focusing unit, Δg=1 and Δg=2 respectively represent the state in which a focus position for the g-line for a close distance is shifted from a focus position for the g-line for infinity in a direction from the periphery of a screen to the center thereof and the state in which the focus position for the g-line for the close distance is shifted from the focus position for the g-line for infinity in a direction from the center of the screen to the periphery thereof when focusing is performed from infinity to the close distance with respect to an off-axis object point using only the first focusing unit, and ΔX2=1 and ΔX2=2 respectively represent the state in which the second focusing unit moves from the image side to the object side and the state in which the second focusing unit moves from the object side to the image side during focusing from infinity to the close distance.

Further features of the present invention will become apparent from the following description of exemplary embodiments with reference to the attached drawings.

DESCRIPTION OF THE EMBODIMENTS

Zoom lenses according to embodiments of the present invention and an image pickup apparatus including a zoom lens according to at least one embodiment will be described in detail with reference to the drawings.

Each of the zoom lenses according to the embodiments of the present invention includes a first lens unit having a negative refractive power, a second lens unit having a positive refractive power, and a rear unit including one or more lens units in order from the object side to the image side. Zooming is performed by changing the distances between the lens units.

In addition, a first focusing unit and a second focusing unit are provided, and the first focusing unit and the second focusing unit are moved independently of each other during focusing.

Focusing is performed by adequately moving the first and second focusing units such that variations in aberrations (in particular, variations in chromatic aberrations) are reduced over the entire object distance range. Thus, high optical performance can be obtained.

Figure 1:
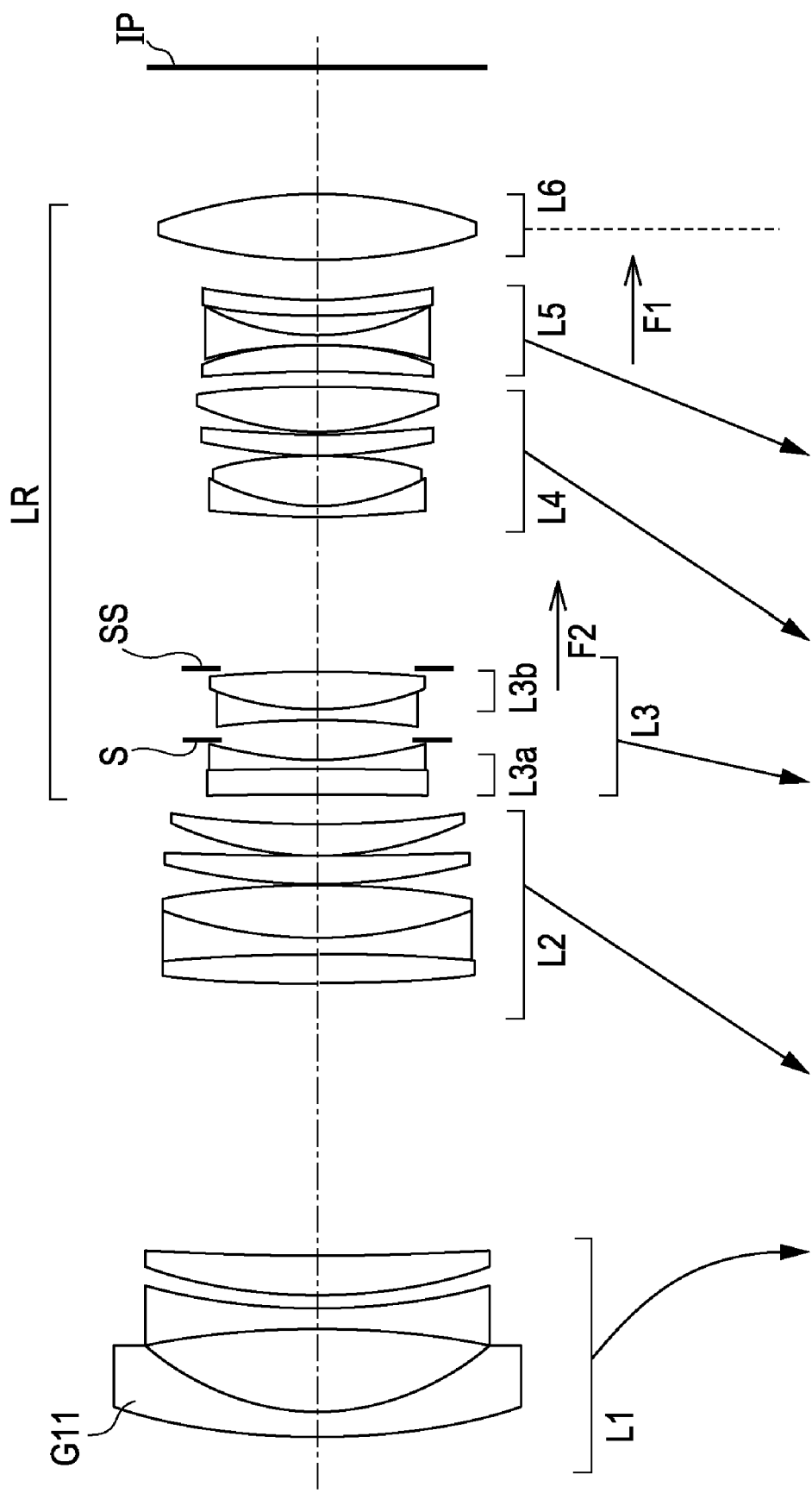
FIG. 1 is a sectional view of a zoom lens according to a first numerical example of the present invention.

FIG. 1 is a sectional view of a zoom lens according to a first embodiment of the present invention at the wide-angle end (short-focal-length end).

Figure 2:
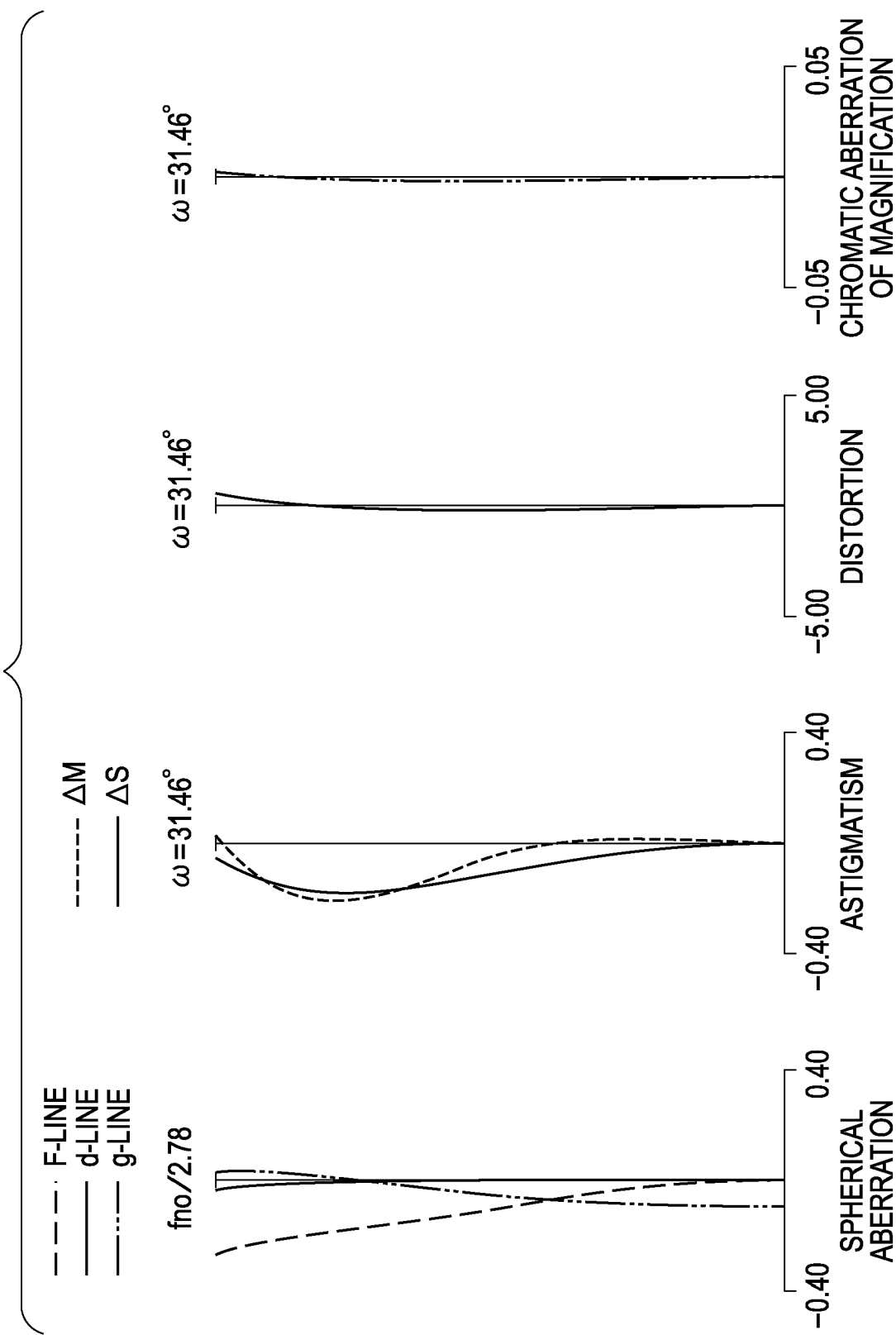
FIG. 2 illustrates aberration diagrams of the zoom lens according to the first numerical example at the wide-angle end when the object distance is infinity.
Figure 3:
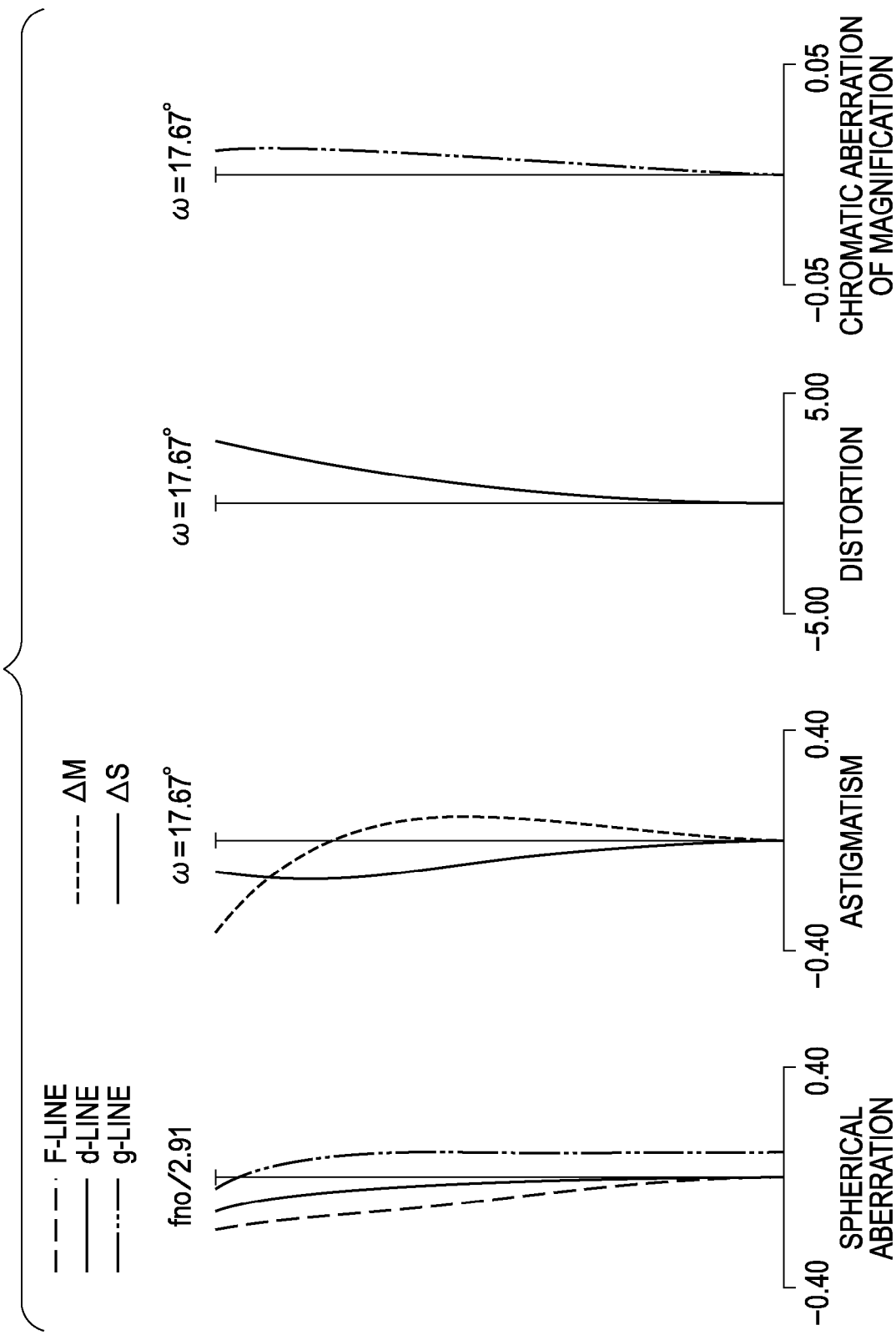
FIG. 3 illustrates aberration diagrams of the zoom lens according to the first numerical example at the telephoto end when the object distance is infinity.

FIGS. 2 and 3 illustrate aberration diagrams of the zoom lens according to the first embodiment at the wide-angle end and the telephoto end (long-focal-length end), respectively, when an object at infinity is in focus.

Figure 4:
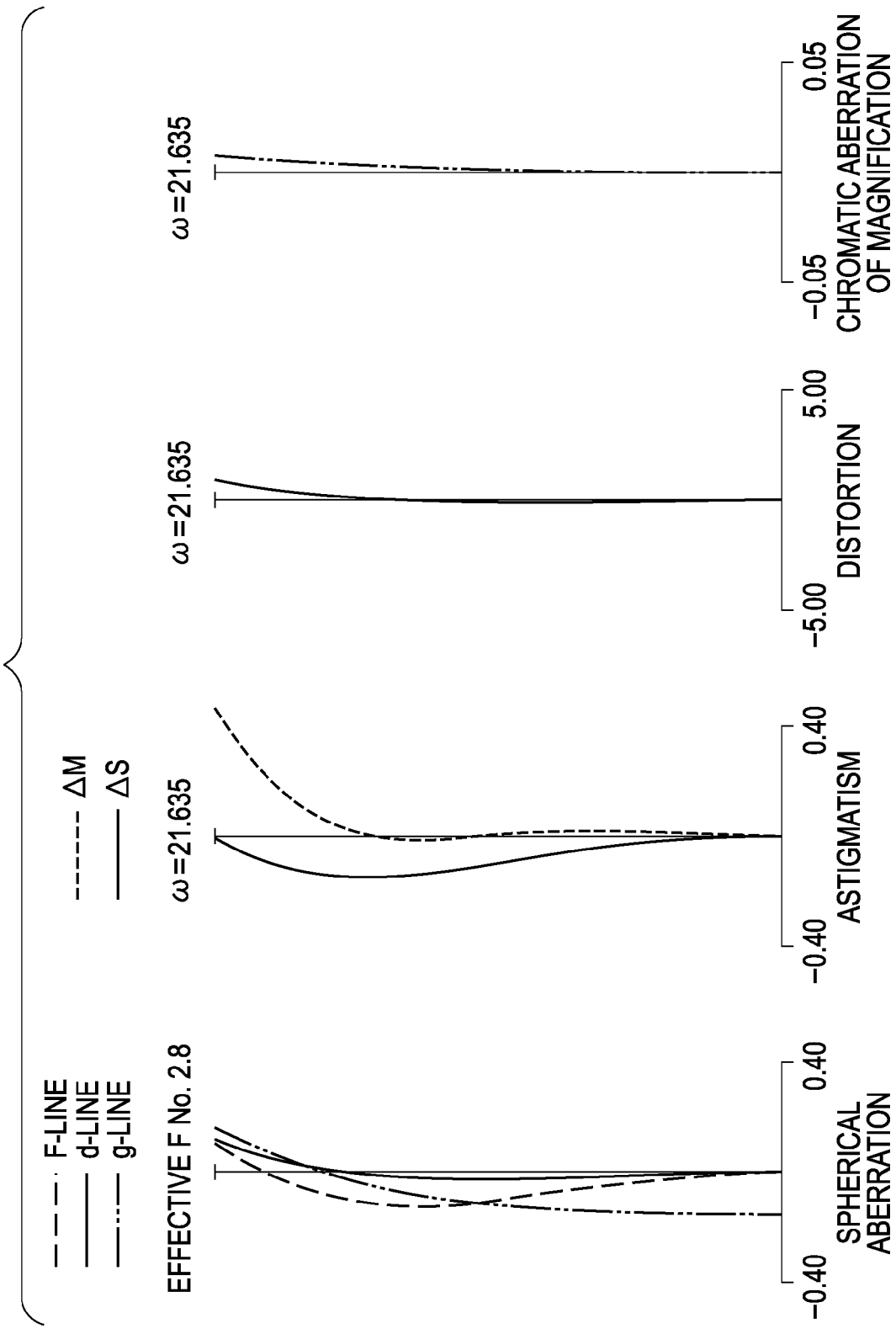
FIG. 4 illustrates aberration diagrams of the zoom lens according to the first numerical example at the wide-angle end when the object distance is a close distance.
Figure 5:
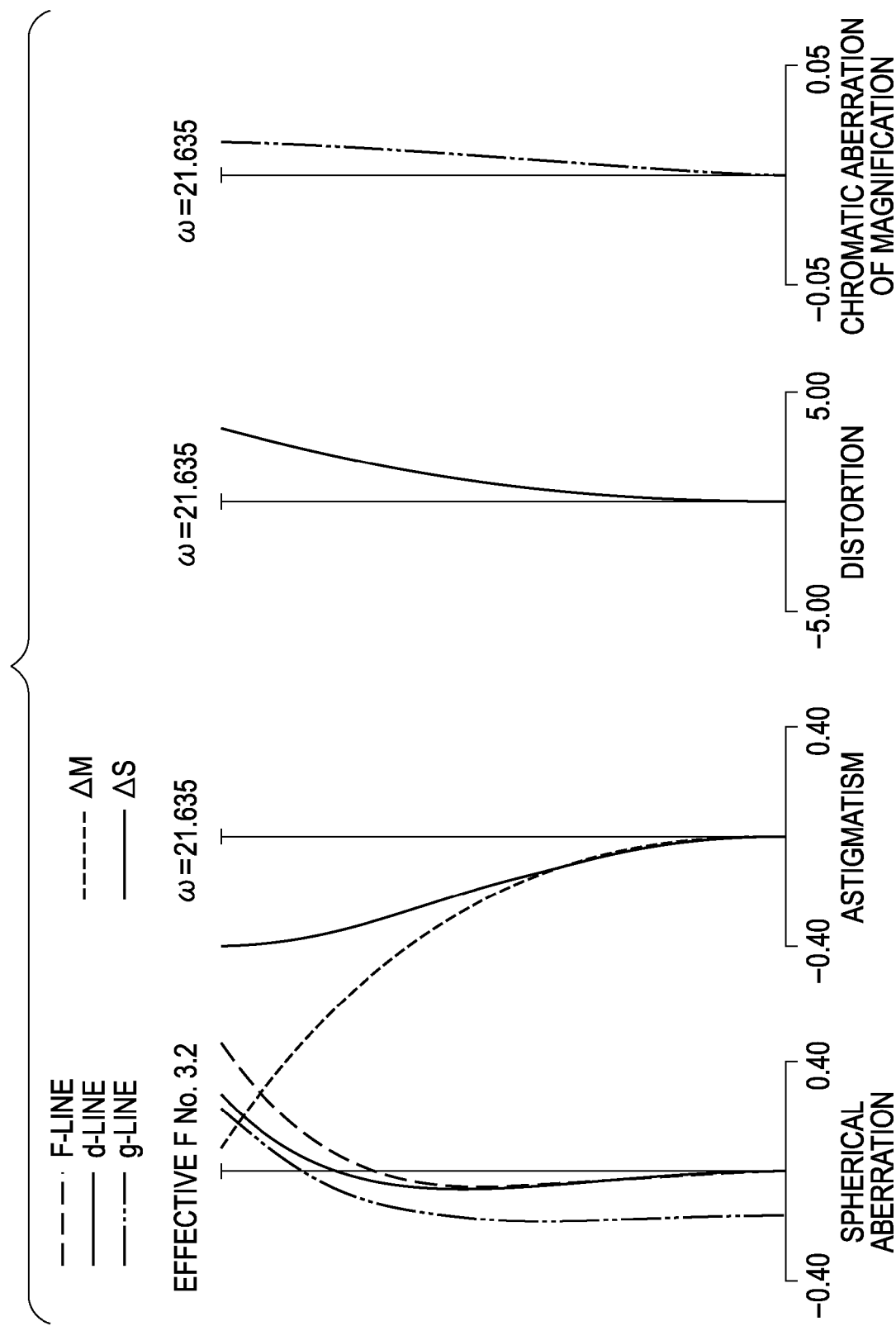
FIG. 5 illustrates aberration diagrams of the zoom lens according to the first numerical example at the telephoto end when the object distance is a close distance.

FIGS. 4 and 5 illustrate aberration diagrams of the zoom lens according to the first embodiment at the wide-angle end and the telephoto end, respectively, when an object at a close distance is in focus.

Figure 6:
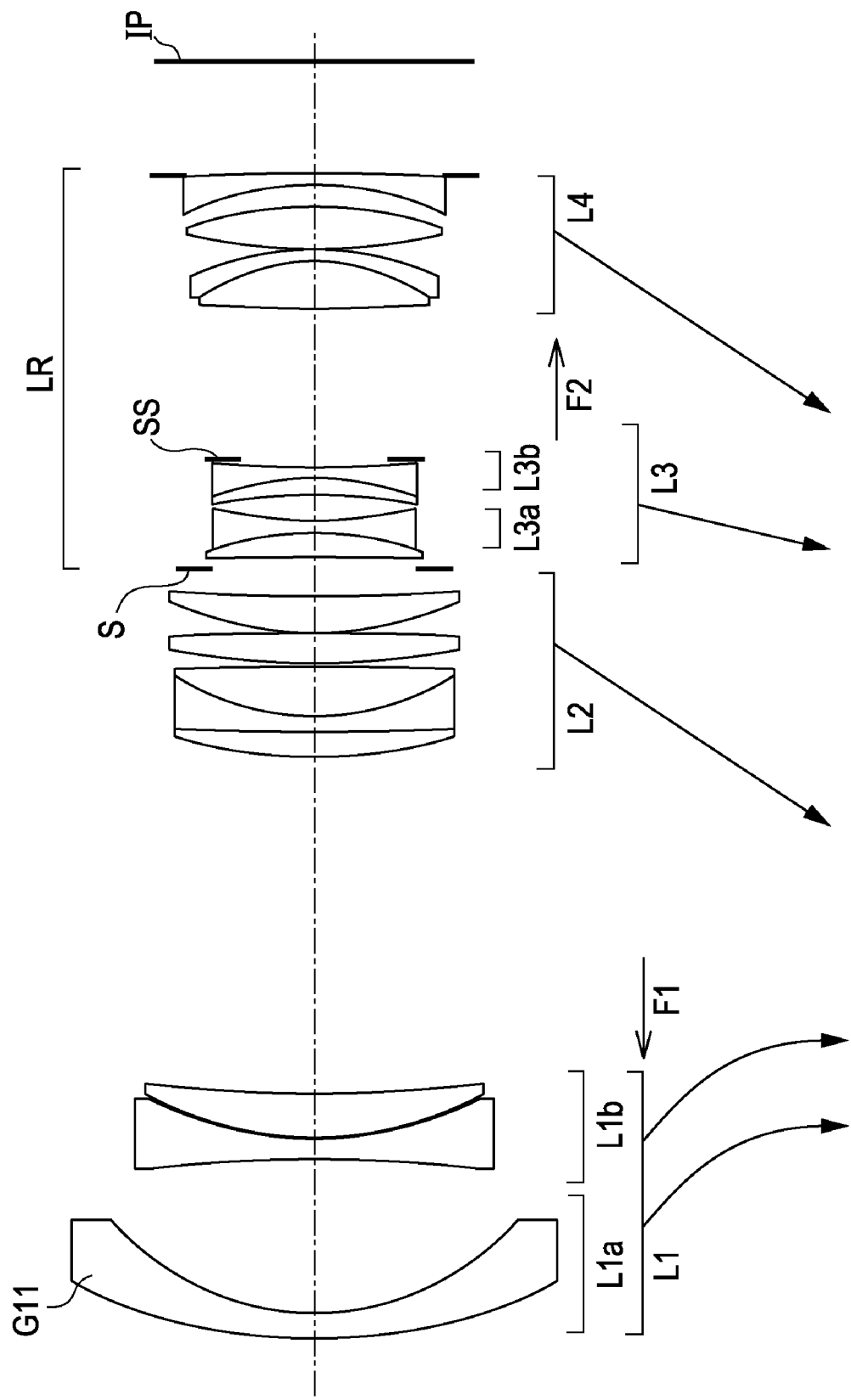
FIG. 6 is a sectional view of a zoom lens according to a second numerical example of the present invention.

FIG. 6 is a sectional view of a zoom lens according to a second embodiment of the present invention at the wide-angle end.

Figure 7:
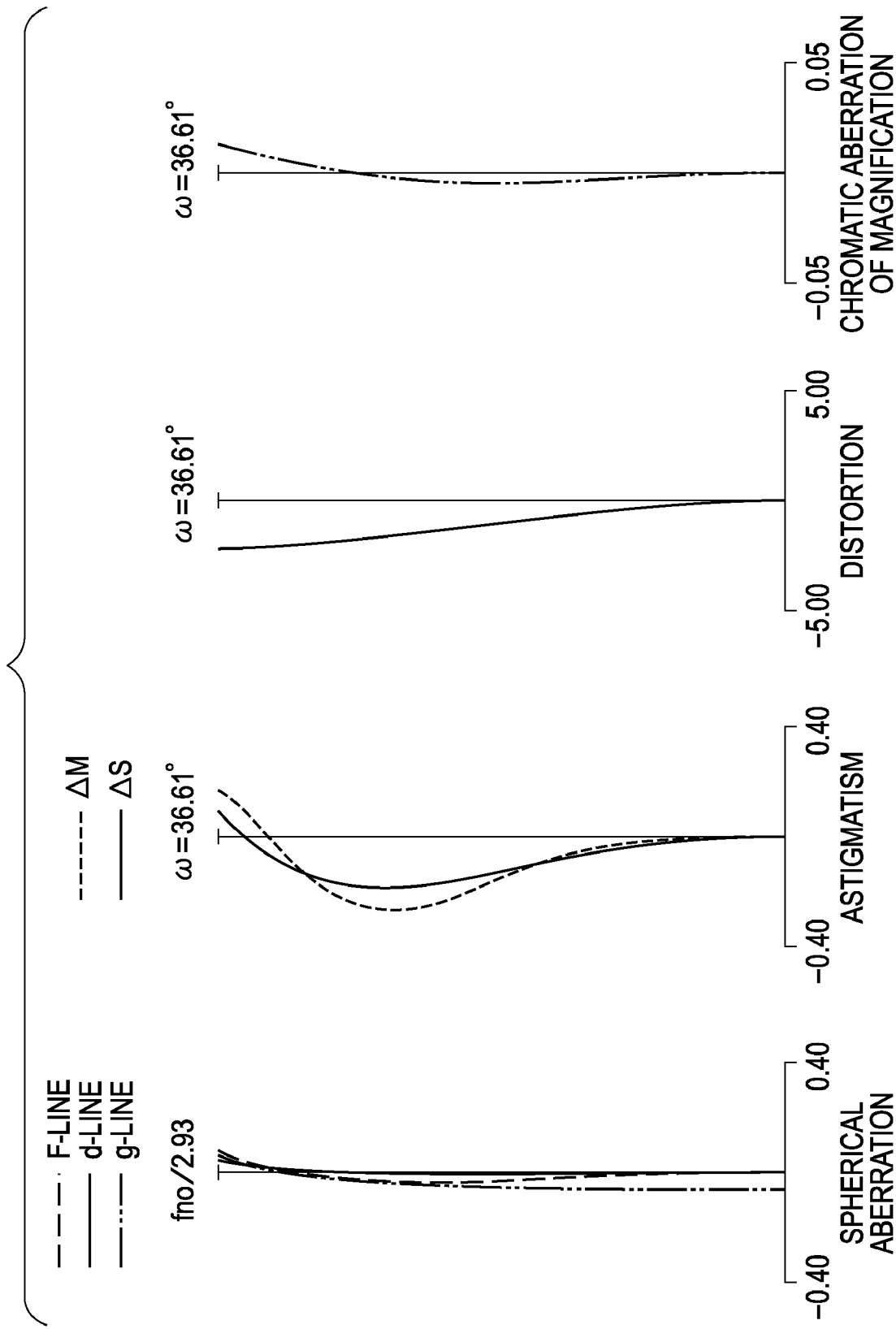
FIG. 7 illustrates aberration diagrams of the zoom lens according to the second numerical example at the wide-angle end when the object distance is infinity.
Figure 8:
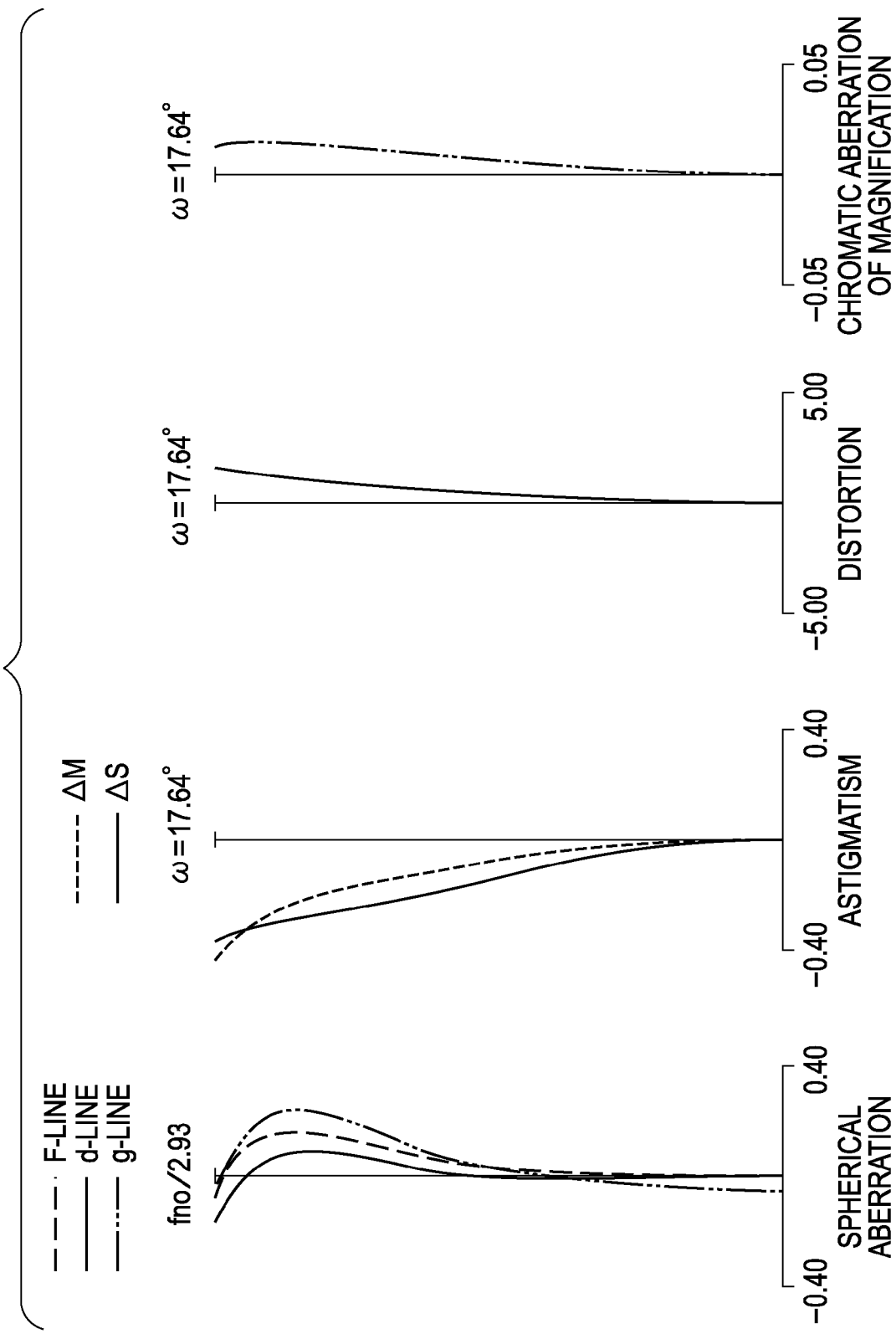
FIG. 8 illustrates aberration diagrams of the zoom lens according to the second numerical example at the telephoto end when the object distance is infinity.

FIGS. 7 and 8 illustrate aberration diagrams of the zoom lens according to the second embodiment at the wide-angle end and the telephoto end, respectively, when an object at infinity is in focus.

Figure 9:
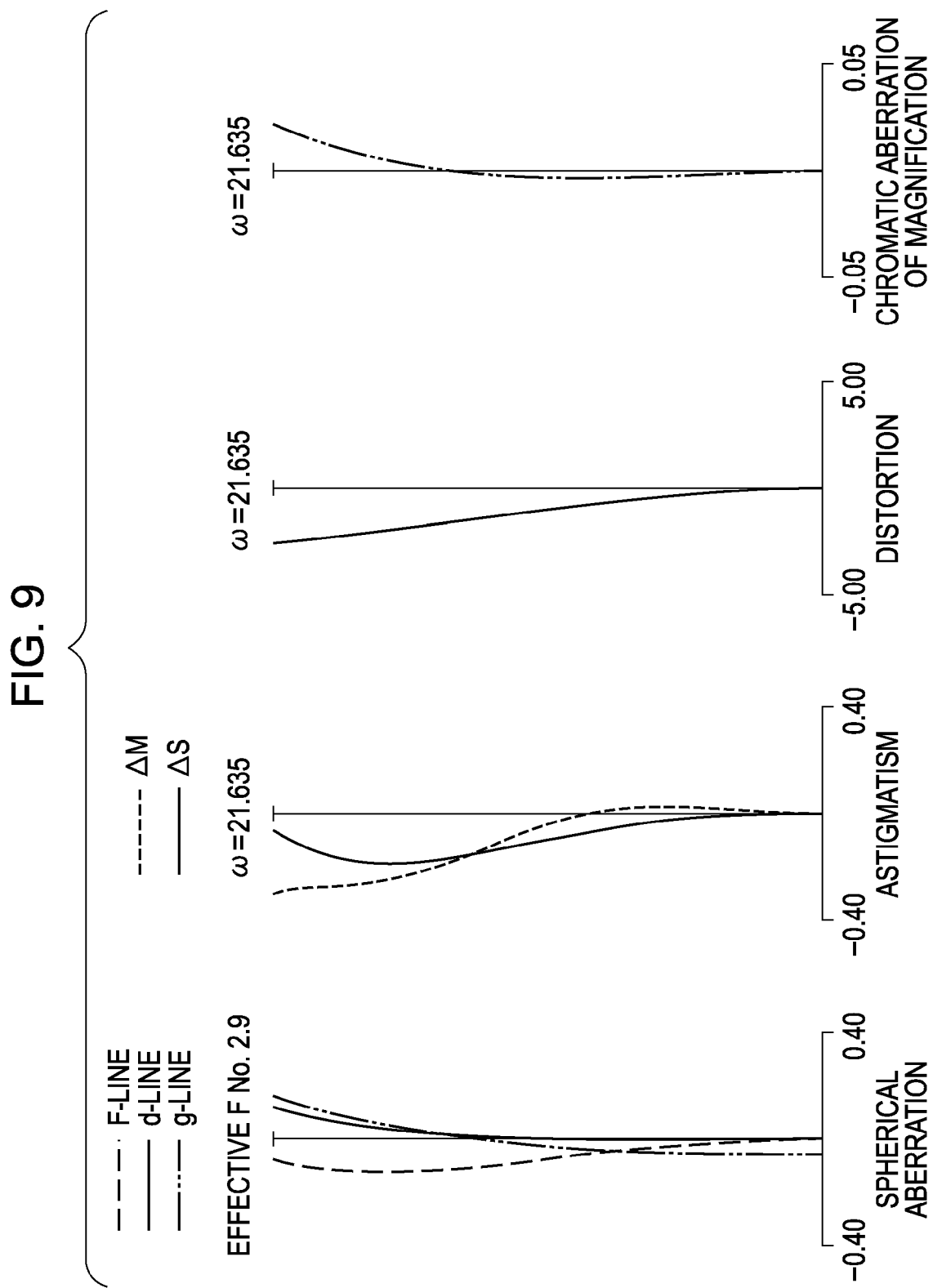
FIG. 9 illustrates aberration diagrams of the zoom lens according to the second numerical example at the wide-angle end when the object distance is a close distance.
Figure 10:
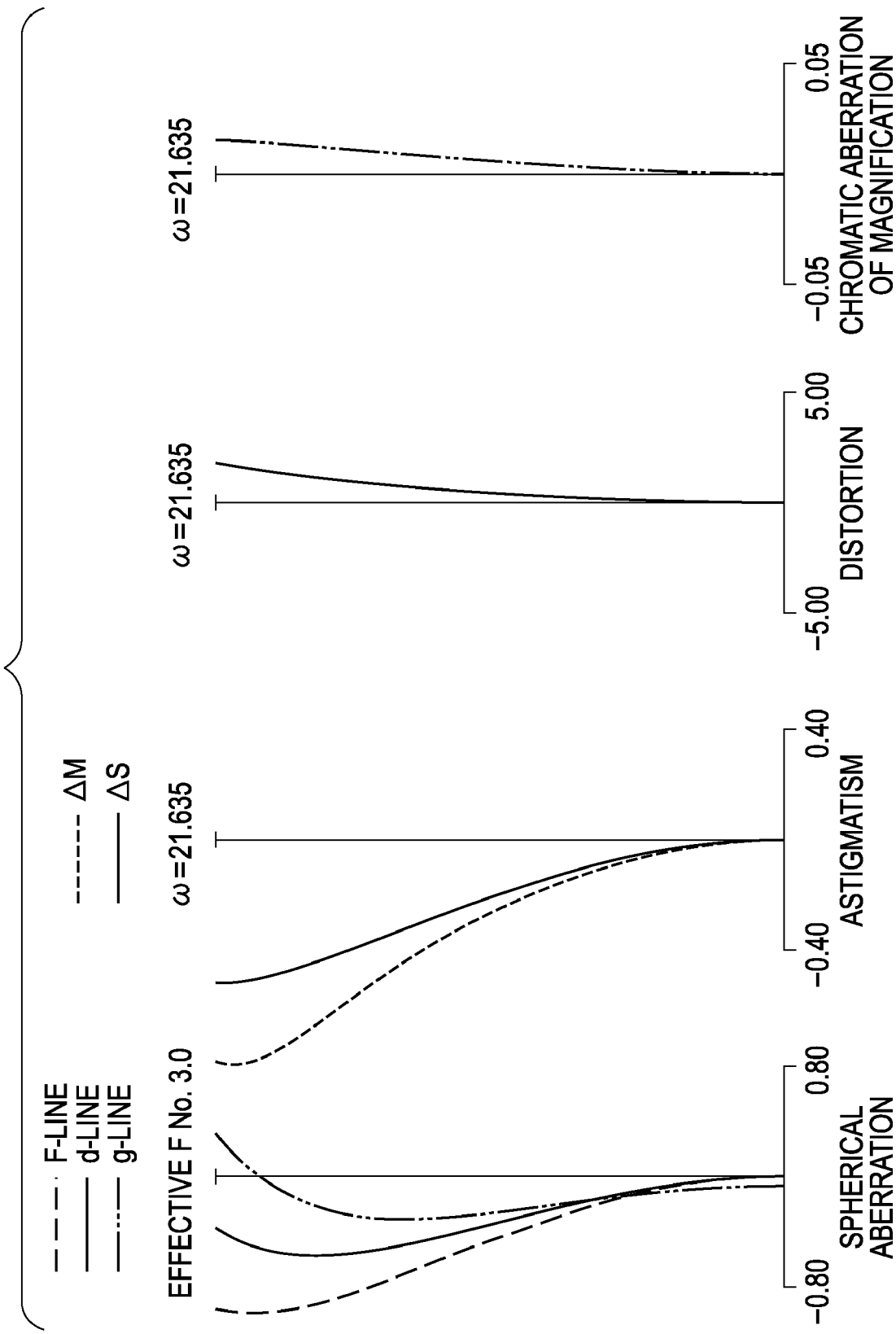
FIG. 10 illustrates aberration diagrams of the zoom lens according to the second numerical example at the telephoto end when the object distance is a close distance.

FIGS. 9 and 10 illustrate aberration diagrams of the zoom lens according to the second embodiment at the wide-angle end and the telephoto end, respectively, when an object at a close distance is in focus.

Figure 11:
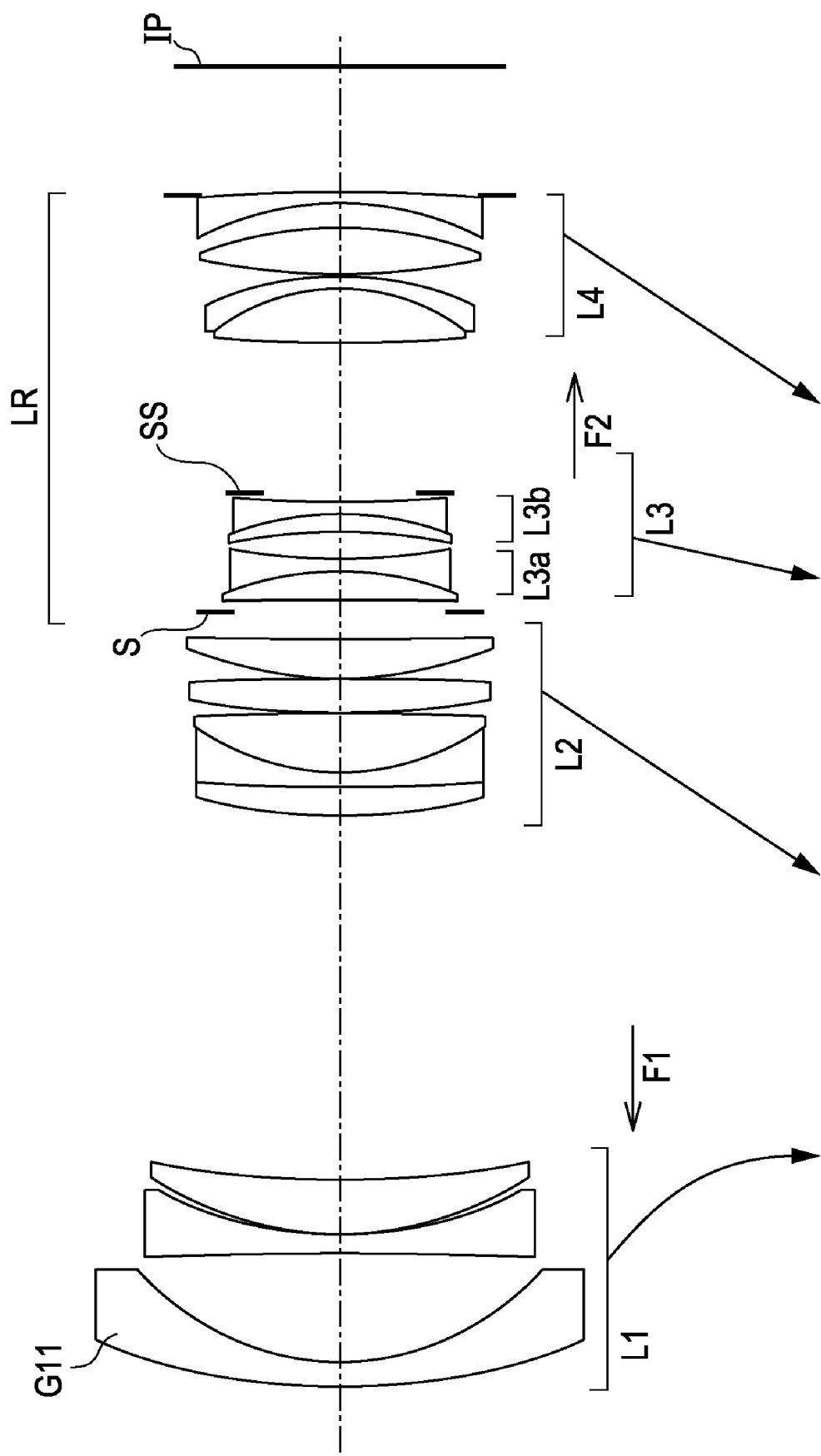
FIG. 11 is a sectional view of a zoom lens according to a third numerical example of the present invention.

FIG. 11 is a sectional view of a zoom lens according to a third embodiment of the present invention at the wide-angle end.

Figure 12:
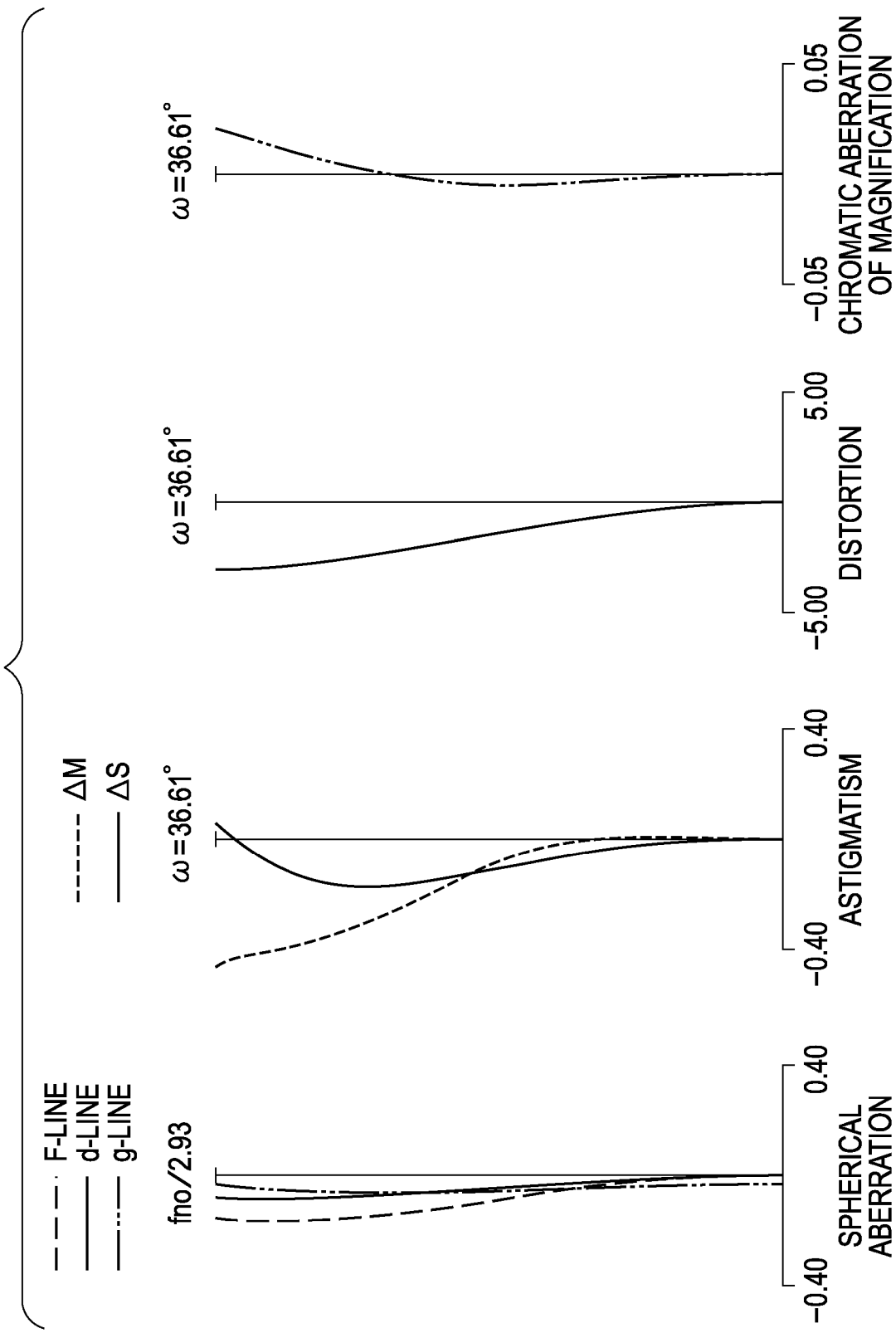
FIG. 12 illustrates aberration diagrams of the zoom lens according to the third numerical example at the wide-angle end when the object distance is infinity.
Figure 13:
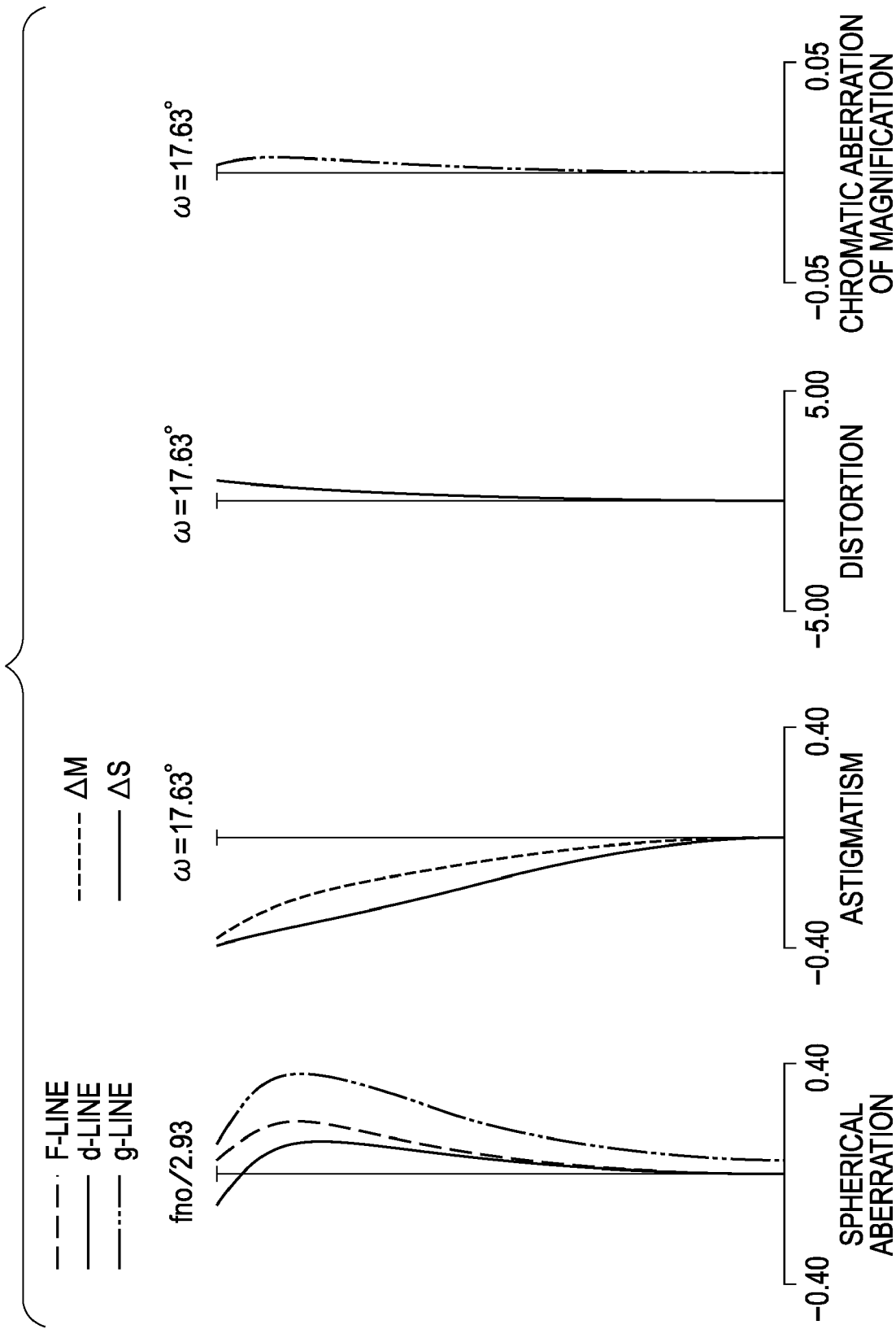
FIG. 13 illustrates aberration diagrams of the zoom lens according to the third numerical example at the telephoto end when the object distance is infinity.

FIGS. 12 and 13 illustrate aberration diagrams of the zoom lens according to the third embodiment at the wide-angle end and the telephoto end, respectively, when an object at infinity is in focus.

Figure 14:
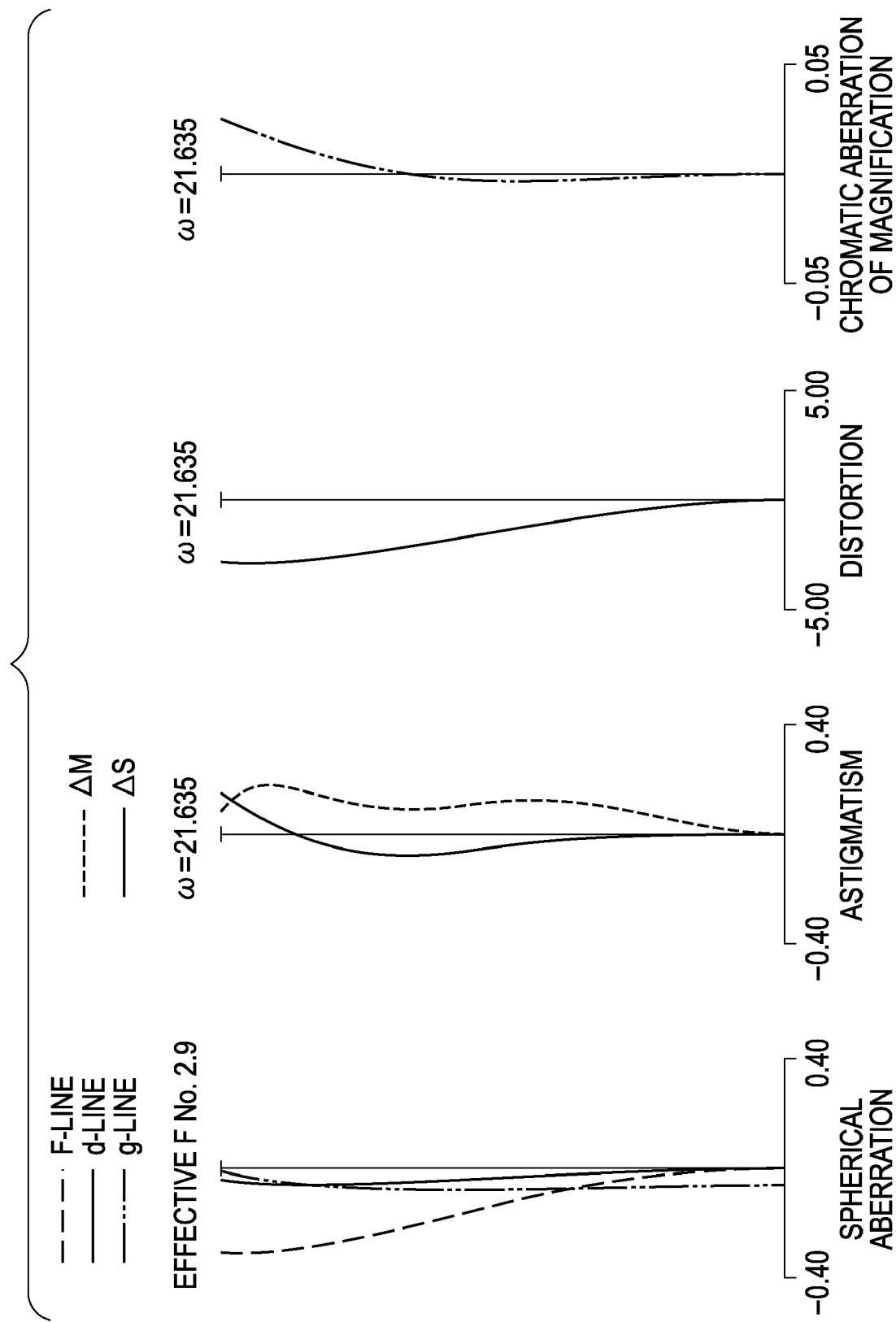
FIG. 14 illustrates aberration diagrams of the zoom lens according to the third numerical example at the wide-angle end when the object distance is a close distance.
Figure 15:
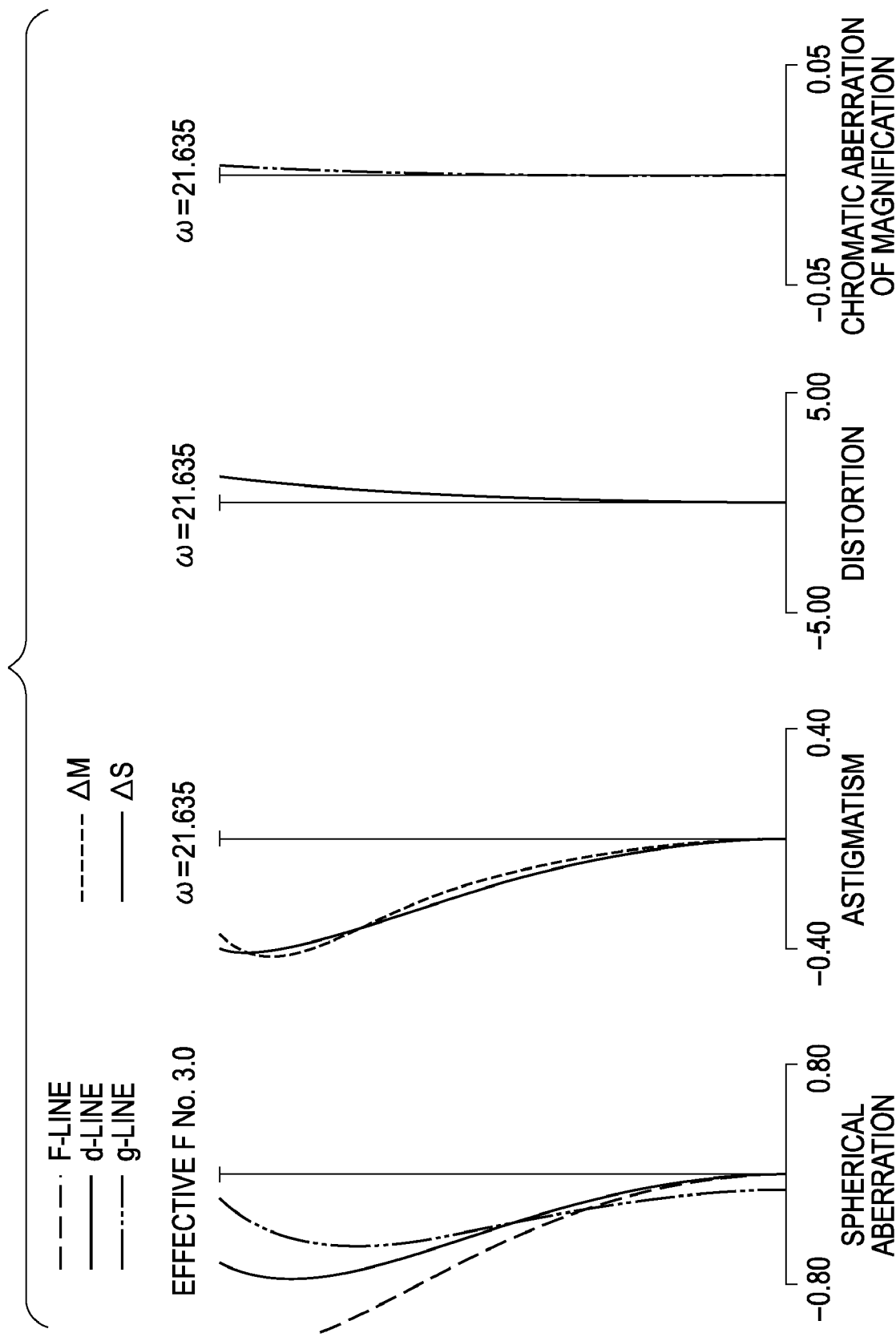
FIG. 15 illustrates aberration diagrams of the zoom lens according to the third numerical example at the telephoto end when the object distance is a close distance.

FIGS. 14 and 15 illustrate aberration diagrams of the zoom lens according to the third embodiment at the wide-angle end and the telephoto end, respectively, when an object at a close distance is in focus.

Figure 16:
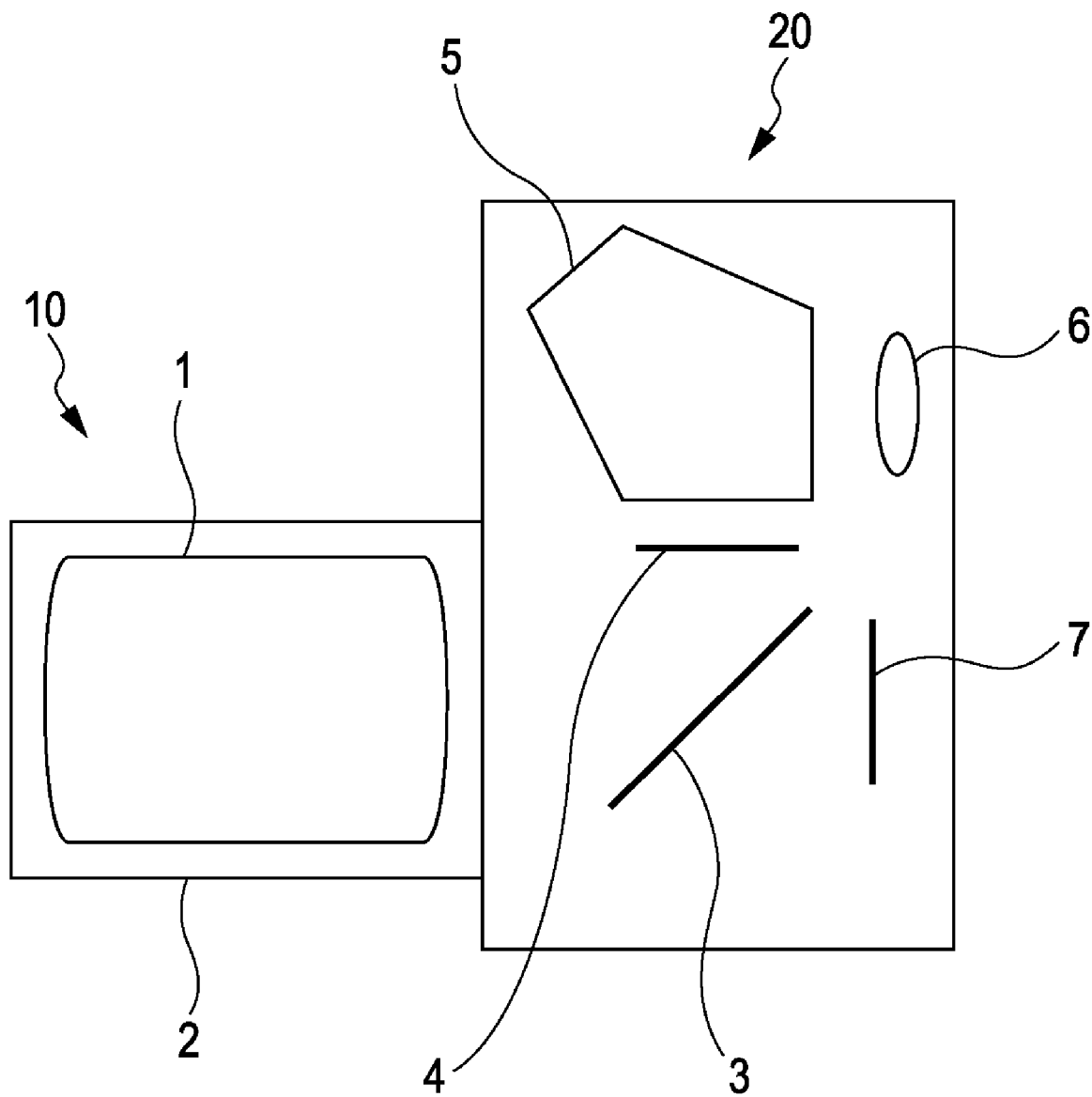
FIG. 16 is a schematic diagram illustrating the main part of an image-pickup apparatus according to an embodiment of a present invention.

FIG. 16 is a schematic diagram illustrating the main part of a single-lens reflex camera (image pickup apparatus) including a zoom lens according to an embodiment of the present invention.

The zoom lens according to each embodiment is an imaging lens system (optical system) included in an image pickup apparatus, such as a video camera, a digital camera, or a silver-halide film camera. In each sectional view, the left side shows the object side (front) and the right side shows the image side (rear). In addition, i denotes the number of each lens unit counted from the object side, and Li denotes the $i^{th}$ lens unit. S denotes an aperture stop, and SS denotes a flare-cutting stop. LR denotes the rear unit including one or more lens units.

IP denotes an image plane. In the case where the zoom lens is used as an imaging optical system of a video camera or a digital still camera, an image pickup plane of a solid-state image pickup element (photoelectric conversion element), such as a CCD sensor and a CMOS sensor, corresponds to the image plane IP. In the case where the zoom lens is used in a silver-halide film camera, a film surface corresponds to the image plane IP.

Loci along which the lens units are moved during zooming from the wide-angle end to the telephoto end are shown by the arrows.

In the aberration diagrams, d, g, and F denote the d-line, the g-line, and the F-line, respectively. ΔM and ΔS denote a meridional image plane and a sagittal image plane, respectively, for the d-line. With regard to the chromatic aberration of magnification, the chromatic aberration of magnification for the g-line is shown. In addition, fno denotes the F-number and ω denotes a half field angle.

In each embodiment, the wide-angle end and the telephoto end are zooming positions corresponding to the states in which the magnification-varying lens unit is at one and other ends of a mechanically movable range along an optical axis.

Each of the zoom lenses according to the embodiments includes a first lens unit L1 having a negative refractive power, a second lens unit L2 having a positive refractive power, and a rear unit LR including one or more lens units, which are arranged in order from the object side to the image side. Zooming is performed by changing the distances between the lens units. In addition, a first focusing unit and a second focusing unit, which are moved independently of each other during focusing, are provided. Each of the first focusing unit and the second focusing unit includes one or more positive lenses and one or more negative lenses.

In each embodiment, at least one of Conditional Expressions (1) and (2) given below is satisfied.

Here, νN1 is an average Abbe number of one or more materials of one or more negative lenses included in the first focusing unit, and νP1 is an average Abbe number of one or more materials of one or more positive lenses included in the first focusing unit.

In addition, νN2 is an average Abbe number of one or more materials of one or more negative lenses included in the second lens unit, and νP2 is an average Abbe number of one or more materials of one or more positive lenses included in the second lens unit.

In the case where focusing is performed from infinity to a close distance with respect to an off-axis object point using only the first focusing unit, the state in which a focus position for the g-line for the close distance is shifted from a focus position for the g-line for infinity in a direction from the periphery of a screen to the center thereof is defined as Δg=1. In addition, the state in which the focus position for the g-line for the close distance is shifted from the focus position for the g-line for infinity in a direction from the center of the screen to the periphery thereof is defined as Δg=2.

In addition, the state in which the first focusing unit moves from the image side to the object side during focusing from infinity to a close distance is defined as ΔX1=1, and the state in which the first focusing unit moves from the object side to the image side during focusing from infinity to a close distance is defined as ΔX1=2.

Similarly, the state in which the second focusing unit moves from the image side to the object side during focusing from infinity to a close distance is defined as ΔX2=1, and the state in which the second focusing unit moves from the object side to the image side during focusing from infinity to a close distance is defined as ΔX2=2.

In addition, the state in which the first focusing unit and the second focusing unit move in the same direction along the optical axis during focusing from infinity to a close distance is defined as Δh1=2, and the state in which the first focusing unit and the second focusing unit move in the opposite directions along the optical axis during focusing from infinity to a close distance is defined as Δh1=1.

Here, at least one of the following conditions is satisfied:

$$(-1)^{\Delta g} \times (\nu N2 - \nu P2) \times (-1)^{\Delta X2} > 0 \quad (1)$$

$$(-1)^{\Delta X1} \times (-1)^{\Delta h1} \times (\nu N1 - \nu P1) \times (\nu N2 - \nu P2) \times (-1)^{\Delta X2} < 0 \quad (2)$$

In each embodiment, the zoom lens includes a first lens unit L1 having a negative refractive power, a second lens unit L2 having a positive refractive power, a third lens unit L3 having a negative refractive power, and a fourth lens unit L4 having a positive refractive power, which are arranged in order from the object side to the image side. When zooming is performed by changing the distances between the lens units, conditional expressions given below are satisfied.

The third lens unit L3 includes a third-a lens unit L3a having a negative refractive power and a third-b lens unit L3b having a negative refractive power. The third-b lens unit L3b includes a positive lens and a negative lens.

As described above, the first focusing unit and the second focusing unit, which move independently of each other during focusing, are provided.

The third-b lens unit L3b serves as the second focusing unit. Here, i denotes the number of each lens unit counted from the object side, and Diw and Dit denote the air distances between the $i^{th}$ lens unit and the $(i+1)^{th}$ lens unit at the wide-angle end and the telephoto end, respectively.

As described above, vN1 is an average Abbe number of one or more materials of one or more negative lenses included in the first focusing unit, and vP1 is an average Abbe number of one or more materials of one or more positive lenses included in the first focusing unit.

In addition, vN2 is an average Abbe number of one or more materials of one or more negative lenses included in the second lens unit, and vP2 is an average Abbe number of one or more materials of one or more positive lenses included in the second lens unit.

In the case where focusing is performed from infinity to a close distance using only the first focusing unit, the state in which the focus position for the g-line for the close distance is shifted from the focus position for the g-line for infinity in a direction from the periphery of a screen to the center thereof is defined as $\Delta g=1$. In addition, the state in which the focus position for the g-line for the close distance is shifted from the focus position for the g-line for infinity in a direction from the center of the screen to the periphery thereof is defined as $\Delta g=2$.

In addition, the state in which the first focusing unit moves from the image side to the object side during focusing from infinity to a close distance is defined as $\Delta X1=1$, and the state in which the first focusing unit moves from the object side to the image side during focusing from infinity to a close distance is defined as $\Delta X1=2$.

Similarly, the state in which the second focusing unit moves from the image side to the object side during focusing from infinity to a close distance is defined as $\Delta X2=1$, and the state in which the second focusing unit moves from the object side to the image side during focusing from infinity to a close distance is defined as $\Delta X2=2$.

In addition, the state in which the first focusing unit and the second focusing unit move in the same direction along the optical axis during focusing from infinity to a close distance is defined as $\Delta h1=2$, and the state in which the first focusing unit and the second focusing unit move in the opposite directions along the optical axis during focusing from infinity to a close distance is defined as $\Delta h1=1$. Here, the following expressions are satisfied:

$$D1w > D1t \quad (7)$$

$$D2w < D2t \quad (8)$$

$$D3w > D3t \quad (9)$$

$$(-1)^{\Delta g} \times (vN2 - vP2) \times (-1)^{\Delta X2} > 0 \quad (1)$$

Alternatively, the following expressions are satisfied:

$$D1w > D1t \quad (7)$$

$$D2w < D2t \quad (8)$$

$$D3w > D3t \quad (9)$$

$$(-1)^{\Delta X1} \times (-1)^{\Delta h1} \times (vN1 - vP1) \times (vN2 - vP2) \times (-1)^{\Delta X2} < 0 \quad (2)$$

In each embodiment, when the zoom lens includes a first lens unit L1 having a negative refractive power, a second lens unit L2 having a positive refractive power, a third lens unit L3 having a negative refractive power, and a fourth lens unit L4 having a positive refractive power, which are arranged in order from the object side to the image side, one or more of the conditions described below can be satisfied.

When f3 and f3b are focal lengths of the third lens unit L3 and the third-b lens unit L3b, respectively, the following expression can be satisfied:

$$0.1 < f3/f3b < 0.5 \quad (3)$$

When f1, f2, and f3 are focal lengths of the first, second, and third lens units L1, L2, and L3, respectively, and fw and ft are focal lengths of the entire system at the wide-angle end and the telephoto end, respectively, one or more of the following conditional expressions can be satisfied:

$$0.7 < |f1|/\sqrt{(fw \times ft)} < 1.2 \quad (4)$$

$$0.5 < f2/\sqrt{(fw \times ft)} < 1 \quad (5)$$

$$0.6 < |f3|/\sqrt{(fw \times ft)} < 1 \quad (6)$$

The positive and negative signs of the directions in which the focusing units are moved during focusing are defined as follows.

That is, the direction from the object side to the image side is defined as positive, and the direction from the image side to the object side is defined as negative.

In the case where focusing is performed from infinity to a close distance using only the first focusing unit L1, the positive and negative signs of the directions in which the focus position for the g-line for the close distance is shifted from the focus position for the g-line for infinity are defined as follows.

That is, the direction from the periphery of the screen to the center thereof is defined as negative, and the direction from the center of the screen to the periphery thereof is defined as positive.

In the conditional expressions, the positive and negative signs are set using $(-1)^X$, which serves as the negative sign when X is 1 and the positive sign when X is 2.

Next, a paraxial chief ray will be explained using coordinates. The optical axis is defined as the X axis, and the direction in which light travels is defined as the positive direction. An axis that is perpendicular to the optical axis is defined as the Y axis. The upper side of the page with respect to the optical axis is defined as the positive direction, and the lower side of the page with respect to the optical axis is defined as the negative direction. The paraxial chief ray travels in the positive direction along the X axis and is incident on the first lens surface on the negative side of the Y axis. Then, the paraxial chief ray passes through the center of the aperture stop, enters the positive side of the Y axis, and reaches the image plane in the positive side of the Y axis.

If there is only one lens in each focusing unit, the Abbe number of that lens is set as the average Abbe number.

The technical meaning of each of the conditional expressions will now be described.

Conditional Expressions (1) and (2) are set to correct the chromatic aberration of magnification generated by the first focusing unit during focusing by the second focusing unit.

Conditional Expressions (1) and (2) are also set to regulate the relationship between the directions in which the lens units are moved during focusing, in consideration of the Abbe numbers of the materials of the positive lens and the negative lens included in the second focusing unit.

If one or both of Conditional Expressions (1) and (2) are not satisfied, the chromatic aberration of magnification largely varies during focusing.

Conditional Expression (3) is set to regulate the relationship between the focal length of the third lens unit L3 and the focal length of the third-b lens unit L3b, that is, the focal length of the second focusing unit. If the refractive power of the third-b lens unit L3b is low relative to the refractive power of the third lens unit L3 and the value of Conditional Expression (3) is less than the lower limit thereof, the third-b lens unit L3b cannot sufficiently correct the aberrations. If the refractive power of the third-b lens unit L3b is high relative to the refractive power of the third lens unit L3 and the value of Conditional Expression (3) is greater than the upper limit thereof, the number of lenses must be increased to reduce the aberrations generated by the third-b lens unit L3b. As a result, the overall lens length increases.

In the zoom lens according to each embodiment, it is assumed that a quick return mirror, a low-pass filter, an infrared cut filter, etc., are disposed on the image side. Therefore, a back focus of a predetermined length must be obtained.

Conditional Expression (4) is set to regulate the range of the focal length of the first lens unit L1 relative to the square root of the product of the focal length of the entire system at the wide-angle end and the focal length of the entire system at the telephoto end. If the refractive power of the first lens unit L1 is too high and the value of Conditional Expression (4) is less than the lower limit thereof, even though a large back focus can be obtained, large aberrations are generated by the first lens unit L1 and it is difficult to correct the generated aberrations with the other lens units. If the refractive power of the first lens unit L1 is too low and the value of Conditional Expression (4) is greater than the upper limit thereof, it is difficult to obtain the predetermined back focus.

Conditional Expression (5) is set to regulate the range of the focal length of the second lens unit L2 relative to the square root of the product of the focal length of the entire system at the wide-angle end and the focal length of the entire system at the telephoto end. If the refractive power of the second lens unit L2 is too high and the value of Conditional Expression (5) is less than the lower limit thereof, even though the size of the lens system can be reduced, large aberrations are generated by the second lens unit L2 and it is difficult to correct the generated aberrations with the other lens units in a balanced manner.

If the refractive power of the second lens unit L2 is too low and the value of Conditional Expression (5) is greater than the upper limit thereof, even though the aberrations can be effectively corrected, the size of the lens system increases.

Conditional Expression (6) is set to regulate the range of the focal length of the third lens unit L3 relative to the square root of the product of the focal length of the entire system at the wide-angle end and the focal length of the entire system at the telephoto end. If the refractive power of the third lens unit L3 is too high and the value of Conditional Expression (6) is less than the lower limit thereof, even though the size of the lens system can be reduced, large aberrations are generated by the third lens unit L3 and it is difficult to correct the generated aberrations with the other lens units. If the refractive power of the third lens unit L3 is too low and the value of Conditional Expression (6) is greater than the upper limit thereof, the size of the lens system increases.

In each embodiment, the numerical ranges of Conditional Expressions (3) to (6) can be set as follows:

$$0.15 < f3/f3b < 0.40 \quad (3a)$$

$$0.75 < |f1|/\sqrt{(fw \times ft)} < 1.10 \quad (4a)$$

$$0.6 < f2/\sqrt{(fw \times ft)} < 0.9 \quad (5a)$$

$$0.70 < |f3|/\sqrt{(fw \times ft)} < 0.95 \quad (6a)$$

Conditional Expressions (7), (8), and (9) are set to adequately set the changes in the distances between the lens units during zooming and to effectively obtain a high zoom ratio in the zoom lens having a first lens unit having a negative refractive power, a second lens unit having a positive refractive power, a third lens unit having a negative refractive power, and a fourth lens unit having a positive refractive power.

It is difficult to effectively obtain a high zoom ratio if any one of the Conditional Expressions (7), (8), and (9) is not satisfied.

As described above, in each embodiment, at least a first lens unit having a negative refractive power and a second lens unit having a positive refractive power are arranged in order from the object side to the image side. In addition, a first focusing unit and a second focusing unit are provided. The lens units are structured as described above so that a high-zoom-ratio, wide-angle-range zoom lens having high optical performance which adequately corrects the chromatic aberrations over the ranges from the wide-angle end to the telephoto end and from infinity to a close distance can be provided.

In the embodiments described below, the first focusing unit is structured as follows.

That is, in the case where a fifth lens unit L5 having a negative refractive power which moves during zooming and a sixth lens unit L6 having a positive refractive power which does not move during zooming are provided on the image side of the fourth lens unit L4, the fifth lens unit L5 serves as the first focusing unit.

In the case where the first lens unit L1 having a negative refractive power, the second lens unit L2 having a positive refractive power, the third lens unit L3 having a negative refractive power, and the fourth lens unit L4 having a positive refractive power are arranged in order from the object side to the image side, the first lens unit L1 serves as the first focusing unit.

In the case where the first lens unit L1 includes a first-a lens unit L1a having a negative refractive power and a first-b lens unit L1b having a negative refractive power and the first-a lens unit L1a and the first-b lens unit L1b move independently of each other during zooming, the first-b lens unit L1b serves as the first focusing unit.

The detailed structure of each embodiment will now be described.

According to a first embodiment shown in FIG. 1, a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power are arranged in order from the object side to the image side.

The third lens unit L3 includes a third-a lens unit L3a having a negative refractive power and a third-b lens unit L3b having a negative refractive power.

During zooming from the wide-angle end to the telephoto end, the first lens unit L1 moves toward the image side while Conditional Expressions (7) to (9) are satisfied. In addition, the second lens unit L2, the third lens unit L3, the fourth lens unit L4, and the fifth lens unit L5 move toward the object side while changing the air distances therebetween. The sixth lens unit L6 does not move with respect to the image plane.

In the first embodiment, each of the lens units serves to change the magnification. Therefore, a predetermined zoom ratio can be obtained with small moving distances and the size of the lens system is reduced.

In addition, a negative lens G11 that is closest to the object side in the first lens unit L1 has an aspherical surface in which the positive refractive power increases from the center of the lens toward the periphery thereof. Accordingly, distortion is adequately corrected particularly at the wide-angle side.

The fifth lens unit L5 serves as the first focusing unit, and moves toward the image side as shown by the arrow F1 during focusing from infinity to a close distance. The distance by which the fifth lens unit L5 is moved for focusing to a certain object distance differs depending on the focal length (zooming position); the distance at the telephoto end is larger than that at the wide-angle end.

The third lens unit L3 having a negative refractive power includes a third-a lens unit L3a having a negative refractive power and a third-b lens unit L3b having a negative refractive power, and the third-b lens unit L3b serves as the second focusing unit. During focusing from infinity to a close distance, the third-b lens unit L3b is moved toward the image side as shown by the arrow F2. Thus, variation in the chromatic aberration of magnification during focusing is reduced. The amount by which the third-b lens unit L3b is moved for focusing to a certain object distance is constant irrespective of the focal length.

The barrel structure can be simplified if the moving distance for focusing to a certain object distance is constant irrespective of the focal length as described above. However, in the case where the correction of aberrations is prioritized over the simple barrel structure, the lens system may be structured such that the moving distance for focusing to a certain object distance differs depending on the focal length.

In the first embodiment, the close distance mentioned above corresponds to an object distance of 380 mm at the wide-angle end and the telephoto end when the numerical examples described below are shown in units of mm.

In addition, in terms of imaging magnification, the close distance corresponds to the state in which the imaging magnifications βw and βt at the wide-angle end and the telephoto end, respectively, are as follows:

βw=0.162

βt=0.287

In a second embodiment shown in FIG. 6, a first lens unit L1 having a negative refractive power, a second lens unit L2 having a positive refractive power, a third lens unit L3 having a negative refractive power, and a fourth lens unit L4 having a positive refractive power are arranged in order from the object side to the image side. The first lens unit L1 includes a first-a lens unit L1a having a negative refractive power and a first-b lens unit L1b having a negative refractive power.

The third lens unit L3 includes a third-a lens unit L3a having a negative refractive power and a third-b lens unit L3b having a negative refractive power.

During zooming from the wide-angle end to the telephoto end, the first lens unit L1 moves toward the image side as a whole while Conditional Expressions (7) to (9) are satisfied. In addition, the second lens unit L2, the third lens unit L3, and the fourth lens unit L4 move toward the object side while changing the air distances therebetween.

The first-a lens unit L1a and the first-b lens unit L1b move while changing the air distance therebetween. Therefore, the zoom lens according to the second embodiment can also be considered as a five-unit zoom lens.

A negative lens G11 that is closest to the object side in the first lens unit L1 has an aspherical surface in which the positive refractive power increases from the center of the lens toward the periphery thereof.

The first-b lens unit L1b serves as the first focusing unit, and moves toward the image side as shown by the arrow F1 during focusing from infinity to a close distance. The amount by which the first-b lens unit L1b is moved for focusing to a certain object distance is constant irrespective of the focal length.

The third lens unit L3 having a negative refractive power includes a third-a lens unit L3a having a negative refractive power and a third-b lens unit L3b having a negative refractive power, and the third-b lens unit L3b serves as the second focusing unit.

During focusing from infinity to a close distance, the third-b lens unit L3b is moved toward the image side as shown by the arrow F2. Thus, variation in the chromatic aberration of magnification during focusing is reduced.

The amount by which the third-b lens unit L3b is moved for focusing to a certain object distance is constant irrespective of the focal length. The barrel structure can be simplified if the moving distance for focusing to a certain object distance is constant irrespective of the focal length as described above.

However, in the case where the correction of aberrations is prioritized over the simple barrel structure, the lens system may be structured such that the moving distance for focusing to a certain object distance differs depending on the focal length.

In the second embodiment, the close distance corresponds to an object distance of 500 mm at the wide-angle end and the telephoto end when the numerical examples described below are shown in units of mm.

In addition, in terms of imaging magnification, the close distance corresponds to the state in which the imaging magnifications βw and βt at the wide-angle end and the telephoto end, respectively, are set as follows:

βw=0.083

βt=0.183

In a third embodiment shown in FIG. 11, a first lens unit L1 having a negative refractive power, a second lens unit L2 having a positive refractive power, a third lens unit L3 having a negative refractive power, and a fourth lens unit L4 having a positive refractive power are arranged in order from the object side to the image side.

The third lens unit L3 includes a third-a lens unit L3a having a negative refractive power and a third-b lens unit L3b having a negative refractive power.

During zooming from the wide-angle end to the telephoto end, the first lens unit L1 moves toward the image side while Conditional Expressions (7) to (9) are satisfied, and the second lens unit L2, the third lens unit L3, and the fourth lens unit L4 move toward the object side while changing the air distances therebetween.

A negative lens G11 that is closest to the object side in the first lens unit L1 has an aspherical surface in which the positive refractive power increases from the center of the lens toward the periphery thereof.

The first lens unit L1 serves as the first focusing unit, and moves toward the object side as shown by the arrow F1 during focusing from infinity to a close distance. The amount by which the first lens unit L1 is moved for focusing to a certain object distance is constant irrespective of the focal length.

The third lens unit L3 having a negative refractive power includes a third-a lens unit L3a having a negative refractive power and a third-b lens unit L3b having a negative refractive power, and the third-b lens unit L3b serves as the second focusing unit. During focusing from infinity to a close distance, the third-b lens unit L3b is moved toward the image side as shown by the arrow F2. Thus, variation in the chromatic aberration of magnification during focusing is reduced.

The amount by which the third-b lens unit L3b is moved for focusing to a certain object distance is constant irrespective of the focal length. The barrel structure can be simplified if the moving distance for focusing to a certain object distance is constant irrespective of the focal length as described above. However, in the case where the correction of aberrations is prioritized over the simple barrel structure, the lens system may be structured such that the moving distance for focusing to a certain object distance differs depending on the focal length.

In the third embodiment, the close distance corresponds to an object distance of 500 mm at the wide-angle end and the telephoto end when the numerical examples described below are shown in units of mm.

In addition, in terms of imaging magnification, the close distance corresponds to the state in which the imaging magnifications βw and βt at the wide-angle end and the telephoto end, respectively, are set as follows:

βw=0.082

βt=0.179

In each of the above-described embodiments, a part of the lens units, for example, the third-a lens unit L3a can be moved in a direction perpendicular to the optical axis so as to correct motion blur caused by hand shake or the like.

A converter lens, an afocal lens unit, etc. having a refractive power can be disposed on the object side of the first lens unit L1 and/or on the image side of the rearmost lens unit.

First to third numerical examples corresponding to the first to third embodiments will now be described. In each numerical example, i denotes the number of each surface counted from the object side.

In each numerical example, Ri denotes the radius of curvature of the $i^{th}$ lens surface from the object side, Di denotes the lens thickness or air distance for the $i^{th}$ lens surface from the object side, and Ni and vi respectively denote the refractive index and the Abbe number of the material of the $i^{th}$ lens from the object side.

In addition, f denotes the focal length, FNo denotes the F-number, and ω denotes a half field angle. When the optical axis is the X axis, an axis perpendicular to the optical axis is the H axis, the direction in which light travels is the positive direction, r is a paraxial radius of curvature and B, C, D, and E are aspherical coefficients, the shape of the aspherical surface is expressed as follows:

$$X = \frac{H^2/r}{1+(1-(H/r)^2)^{1/2}} + B \cdot H^4 + C \cdot H^6 + D \cdot H^8 + E \cdot H^{10}$$

In the second and third numerical examples, the last surface r30 is a plane (dummy plane) used for the design.

Table 1 provided below shows the relationship between the above-described conditional expressions and the numerical examples.

FIRST NUMERICAL EXAMPLE

| f = 35.4~67.9 FNo = 1:2.9 2ω = 62.9°~35.3° | | | |
|---|---|---|---|
| r1 = 109.671(aspherical) | d1 = 3.00 | n1 = 1.65160 | v1 = 58.5 |
| r2 = 32.249 | d2 = 10.26 | | |
| r3 = −115.127 | d3 = 2.50 | n2 = 1.80400 | v2 = 46.6 |
| r4 = 78.676 | d4 = 1.67 | | |
| r5 = 70.460 | d5 = 4.88 | n3 = 1.60342 | v3 = 38.0 |
| r6 = 392.151 | d6 = Variable | | |
| r7 = 306.685 | d7 = 3.52 | n4 = 1.83481 | v4 = 42.7 |
| r8 = −203.929 | d8 = 2.00 | n5 = 1.74077 | v5 = 27.8 |
| r9 = 55.613 | d9 = 6.51 | n6 = 1.83481 | v6 = 42.7 |
| r10 = −102.842 | d10 = 0.15 | | |
| r11 = 76.148 | d11 = 3.28 | n7 = 1.80400 | v7 = 46.6 |
| r12 = 376.318 | d12 = 0.15 | | |
| r13 = 44.370 | d13 = 3.84 | n8 = 1.69680 | v8 = 55.5 |
| r14 = 133.715 | d14 = Variable | | |
| r15 = −520.702 | d15 = 3.00 | n9 = 1.69350 | v9 = 53.2 |
| r16 = −535.738 | d16 = 1.20 | n10 = 1.80400 | v10 = 46.6 |
| r17 = 44.095 | d17 = 2.50 | | |
| r18 = 0.000(aperture) | d18 = 2.40 | | |
| r19 = −80.023 | d19 = 1.30 | n11 = 1.81554 | v11 = 44.4 |
| r20 = 38.267 | d20 = 4.59 | n12 = 1.80518 | v12 = 25.4 |
| r21 = −130.916 | d21 = 0.47 | | |
| r22 = 0.000 | d22 = Variable | | |
| r23 = 161.296 | d23 = 1.30 | n13 = 1.84666 | v13 = 23.9 |
| r24 = 27.277 | d24 = 6.15 | n14 = 1.43875 | v14 = 95.0 |
| r25 = −49.033 | d25 = 0.15 | | |
| r26 = 67.340 | d26 = 2.67 | n15 = 1.63854 | v15 = 55.4 |
| r27 = 189.142 | d27 = 0.15 | | |
| r28 = 37.261 | d28 = 5.58 | n16 = 1.69680 | v16 = 55.5 |
| r29 = −102.956 | d29 = Variable | | |
| r30 = −135.435 | d30 = 3.02 | n17 = 1.84666 | v17 = 23.9 |
| r31 = −45.728 | d31 = 0.15 | | |
| r32 = −53.262 | d32 = 1.20 | n18 = 1.77250 | v18 = 49.6 |
| r33 = 28.626 | d33 = 2.50 | | |
| r34 = 121.291 | d34 = 1.80 | n19 = 1.86300 | v19 = 41.5 |
| r35 = 65.041 | d35 = Variable | | |

-continued f = 35.4~67.9 FNo = 1:2.9 2ω = 62.9°~35.3°

| r36 = 64.599 | d36 = 8.10 | n20 = 1.48749 | ν20 = 70.2 |
| r37 = −54.407 | d37 | | |

| | Focal Length | | |
|---|---|---|---|
| Variable Distance | 35.36 | 48.65 | 67.93 |
| d6 | 33.52 | 15.53 | 2.40 |
| d14 | 3.67 | 8.98 | 17.34 |
| d22 | 18.58 | 13.27 | 4.91 |
| d29 | 1.88 | 3.38 | 5.44 |
| d35 | 4.94 | 8.68 | 10.90 |
| skinf | 39.97 | 39.97 | 39.97 |

Aspherical Coefficients
1st Surface

| b | c | d | e | f |
|---|---|---|---|---|
| 1.415629e−06 | 7.781292e−10 | −1.691302e−12 | 1.625214e−15 | −6.459461e−19 |

SECOND NUMERICAL EXAMPLE f = 29.1~68.0 FNo = 1:2.9 2ω = 73.2°~35.3°

| r1 = 79.614(aspherical) | d1 = 3.00 | n1 = 1.71300 | ν1 = 53.8 |
| r2 = 33.214 | d2 = Variable | | |
| r3 = −171.539 | d3 = 2.35 | n2 = 1.80400 | ν2 = 46.6 |
| r4 = 44.737 | d4 = 0.52 | | |
| r5 = 44.819 | d5 = 5.02 | n3 = 1.84666 | ν3 = 23.9 |
| r6 = 150.832 | d6 = Variable | | |
| r7 = 64.113 | d7 = 3.07 | n4 = 1.77250 | ν4 = 49.6 |
| r8 = 466.563 | d8 = 1.80 | n5 = 1.84666 | ν5 = 23.9 |
| r9 = 31.819 | d9 = 6.55 | n6 = 1.64850 | ν6 = 53.0 |
| r10 = −244.677 | d10 = 0.15 | | |
| r11 = 98.761 | d11 = 3.68 | n7 = 1.65160 | ν7 = 58.5 |
| r12 = −382.031 | d12 = 0.15 | | |
| r13 = 46.544 | d13 = 4.42 | n8 = 1.80610 | ν8 = 41.0 |
| r14 = 231.728 | d14 = Variable | | |
| r15 = 0.000(aperture) | d15 = 1.50 | | |
| r16 = −357.828 | d16 = 2.96 | n9 = 1.75550 | ν9 = 25.1 |
| r17 = −39.011 | d17 = 1.40 | n10 = 1.80400 | ν10 = 46.6 |
| r18 = 52.827 | d18 = 3.26 | | |
| r19 = −65.790 | d19 = 2.03 | n11 = 1.80518 | ν11 = 25.4 |
| r20 = −35.787 | d20 = 1.40 | n12 = 1.48749 | ν12 = 70.2 |
| r21 = 210.178 | d21 = 1.00 | | |
| r22 = 0.000 | d22 = Variable | | |
| r23 = 242.523 | d23 = 5.82 | n13 = 1.51633 | ν13 = 64.2 |
| r24 = −25.187 | d24 = 1.40 | n14 = 1.66446 | ν14 = 35.8 |
| r25 = −37.987 | d25 = 0.15 | | |
| r26 = 74.493 | d26 = 5.10 | n15 = 1.65160 | ν15 = 58.5 |
| r27 = −50.434 | d27 = 2.79 | | |
| r28 = −36.178 | d28 = 1.40 | n16 = 1.84666 | ν16 = 23.9 |
| r29 = −226.295 | d29 = Variable | | |
| r30 = 0.000 | d30 | | |

| | Focal Length | | |
|---|---|---|---|
| Variable Distance | 29.12 | 50.22 | 68.04 |
| d2 | 19.24 | 19.50 | 19.24 |
| d6 | 41.68 | 11.81 | 2.12 |
| d14 | 3.30 | 11.80 | 17.61 |
| d22 | 18.54 | 10.04 | 4.23 |
| d29 | −0.33 | 8.02 | 15.88 |
| skinf | 39.99 | 39.99 | 39.99 |

Aspherical Coefficients
1st Surface

| b | c | d | e |
|---|---|---|---|
| 9.615046e−07 | 5.204449e−10 | −4.958848e−13 | 2.584752e−16 |

THIRD NUMERICAL EXAMPLE f = 29.1~68.1 FNo = 1:2.9 2ω = 73.2°~35.3°

| r1 = 91.221(aspherical) | d1 = 3.00 | n1 = 1.71300 | ν1 = 53.8 |
| r2 = 31.445 | d2 = Variable | | |
| r3 = −409.043 | d3 = 2.35 | n2 = 1.80400 | ν2 = 46.6 |
| r4 = 48.264 | d4 = 0.53 | | |
| r5 = 43.866 | d5 = 5.78 | n3 = 1.84666 | ν3 = 23.9 |
| r6 = 117.648 | d6 = Variable | | |
| r7 = 66.782 | d7 = 3.39 | n4 = 1.77250 | ν4 = 49.6 |
| r8 = 246.504 | d8 = 1.80 | n5 = 1.84666 | ν5 = 23.9 |
| r9 = 29.679 | d9 = 6.92 | n6 = 1.64850 | ν6 = 53.0 |
| r10 = −487.891 | d10 = 0.15 | | |
| r11 = 103.836 | d11 = 3.88 | n7 = 1.65160 | ν7 = 58.5 |
| r12 = −582.969 | d12 = 0.15 | | |
| r13 = 47.114 | d13 = 4.70 | n8 = 1.80610 | ν8 = 41.0 |
| r14 = 556.008 | d14 = Variable | | |
| r15 = 0.000(aperture) | d15 = 1.50 | | |
| r16 = −402.171 | d16 = 3.23 | n9 = 1.75550 | ν9 = 25.1 |
| r17 = −36.737 | d17 = 1.40 | n10 = 1.80400 | ν10 = 46.6 |
| r18 = 54.934 | d18 = 3.38 | | |
| r19 = −60.679 | d19 = 2.08 | n11 = 1.80518 | ν11 = 25.4 |
| r20 = −34.487 | d20 = 1.40 | n12 = 1.48749 | ν12 = 70.2 |
| r21 = 166.187 | d21 = 1.00 | | |
| r22 = 0.000 | d22 = Variable | | |
| r23 = 177.454 | d23 = 6.53 | n13 = 1.51633 | ν13 = 64.2 |
| r24 = −23.640 | d24 = 1.40 | n14 = 1.66446 | ν14 = 35.8 |
| r25 = −37.936 | d25 = 0.15 | | |
| r26 = 77.901 | d26 = 5.54 | n15 = 1.65160 | ν15 = 58.5 |
| r27 = −47.123 | d27 = 2.90 | | |
| r28 = −36.199 | d28 = 1.40 | n16 = 1.84666 | ν16 = 23.9 |
| r29 = −191.098 | d29 = Variable | | |
| r30 = 0.000 | d30 | | |

| | Focal Length | | |
|---|---|---|---|
| Variable Distance | 29.12 | 50.21 | 68.06 |
| d2 | 12.83 | 12.83 | 12.83 |
| d6 | 43.18 | 12.96 | 3.02 |
| d14 | 3.19 | 11.60 | 17.31 |
| d22 | 17.74 | 9.34 | 3.62 |
| d29 | −0.41 | 7.98 | 15.88 |
| skinf | 42.17 | 42.17 | 42.17 |

Aspherical Coefficients
1st Surface

| b | c | d | e |
|---|---|---|---|
| 9.386768e−07 | 4.510339e−10 | −4.965978e−13 | 2.585553e−16 |

TABLE 1

| Conditional No | Expression | 1st Embodiment | 2nd Embodiment | 3rd Embodiment |
|---|---|---|---|---|
| 3 | f3/f3b | 0.17 | 0.23 | 0.27 |
| 4 | $|f1|/\sqrt{fw \times ft}$ | 0.80 | 0.95 | 1.00 |
| 5 | $f2/\sqrt{fw \times ft}$ | 0.65 | 0.77 | 0.80 |
| 6 | $|f3|/\sqrt{fw \times ft}$ | 0.85 | 0.92 | 0.89 |

Next, an image-pickup apparatus including a zoom lens according to at least one of the first to third embodiments will be described with reference to FIG. 16.

FIG. 16 is a schematic diagram illustrating the main part of a single-lens reflex camera. In FIG. 16, an imaging lens 10 includes a zoom lens 1 according to at least one of the first to third embodiments. The zoom lens 1 is held by a barrel 2, which functions as a holding member.

A camera body 20 includes a quick return mirror 3 which reflects light rays from the imaging lens 10 upward and a focusing screen 4 disposed at an image-forming position of the imaging lens 10. The camera body 20 also includes a penta-roof prism 5 which converts an inverse image formed on the focusing screen 4 into an erect image and an ocular lens 6 with which the erect image can be observed.

A solid-state image pickup element (photoelectric conversion element), such as a CCD sensor and a CMOS sensor, for receiving an image or a silver-halide film is disposed on a photosensitive surface 7. In a shooting operation, the quick return mirror 3 is moved away from an optical path and an image is formed on the photosensitive surface 7 by the imaging lens 10.

The advantages explained in the first to third embodiments are effectively obtained in the image-pickup apparatus structured as described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-006535 filed Jan. 16, 2008, which is hereby incorporated by reference herein in its entirety.

What is claimed is:

1. A zoom lens comprising:
a first lens unit having a negative refractive power;
a second lens unit having a positive refractive power;
a rear unit including one or more lens units,
wherein the first lens unit, the second lens unit, and the rear unit are arranged in order from the object side to the image side,
wherein the zoom lens performs zooming by changing distances between the first, second, and rear lens units; and
a first focusing unit and a second focusing unit which move independently of each other during focusing, the second focusing unit including one or more positive lenses and one or more negative lenses,
wherein the following condition is satisfied:

$$(-1)^{\Delta g} \times (\nu N2 - \nu P2) \times (-1)^{\Delta X2} > 0$$

where νN2 is an average Abbe number of one or more materials of the one or more negative lenses in the second focusing unit, νP2 is an average Abbe number of one or more materials of the one or more positive lenses in the second focusing unit, Δg=1 and Δg=2 respectively represent the state in which a focus position for the g-line for a close distance is shifted from a focus position for the g-line for infinity in a direction from the periphery of a screen to the center thereof and the state in which the focus position for the g-line for the close distance is shifted from the focus position for the g-line for infinity in a direction from the center of the screen to the periphery thereof when focusing is performed from infinity to the close distance with respect to an off-axis object point using only the first focusing unit, and ΔX2=1 and ΔX2=2 respectively represent the state in which the second focusing unit moves from the image side to the object side and the state in which the second focusing unit moves from the object side to the image side during focusing from infinity to the close distance.

2. An image pickup apparatus comprising:
the zoom lens according to claim 1; and
a solid-state image pickup element which receives an image formed by the zoom lens.

3. A zoom lens comprising:
a first lens unit having a negative refractive power;
a second lens unit having a positive refractive power;
a rear unit including one or more lens units,
wherein the first lens unit, the second lens unit, and the rear unit are arranged in order from the object side to the image side,
wherein the zoom lens performs zooming by changing distances between the first, second, and rear lens units; and
a first focusing unit and a second focusing unit which move independently of each other during focusing, each of the first focusing unit and the second focusing unit including one or more positive lenses and one or more negative lenses,
wherein the following condition is satisfied:

$$(-1)^{\Delta X1} \times (-1)^{\Delta h1} \times (\nu N1 - \nu P1) \times (\nu N2 - \nu P2) \times (-1)^{\Delta X2} < 0$$

where νN1 is an average Abbe number of one or more materials of the one or more negative lenses in the first focusing unit, νP1 is an average Abbe number of one or more materials of the one or more positive lenses in the first focusing unit, νN2 is an average Abbe number of one or more materials of the one or more negative lenses in the second focusing unit, νP2 is an average Abbe number of one or more materials of the one or more positive lenses in the second focusing unit, ΔX1=1 and ΔX1=2 respectively represent the state in which the first focusing unit moves from the image side to the object side and the state in which the first focusing unit moves from the object side to the image side during focusing from infinity to a close distance, ΔX2=1 and ΔX2=2 respectively represent the state in which the second focusing unit moves from the image side to the object side and the state in which the second focusing unit moves from the object side to the image side during focusing from infinity to the close distance, and Δh1=2 and Δh1=1 respectively represent the state in which the first focusing unit and the second focusing unit move in the same direction along an optical axis and the state in which the first focusing unit and the second focusing unit move in the opposite directions along the optical axis.

4. A zoom lens comprising:
a first lens unit having a negative refractive power;
a second lens unit having a positive refractive power;
a third lens unit having a negative refractive power;
a fourth lens unit having a positive refractive power, wherein the first lens unit, the second lens unit, the third lens unit, and the fourth lens unit are arranged in order from the object side to the image side, wherein the zoom lens performs zooming by changing distances between the first through fourth lens units, wherein the third lens unit includes a third-a lens unit and a third-b lens unit, the third-b lens unit including a positive lens and a negative lens; and a first focusing unit and a second focusing unit which move independently of each other during focusing, the third-b lens unit serving as the second focusing unit, wherein the following conditions are satisfied:

$D1w > D1t$ $D2w < D2t$ $D3w > D3t$ $(-1)^{\Delta g} \times (\nu N2 - \nu P2) \times (-1)^{\Delta X2} > 0$ where i denotes the number of each lens unit counted from the object side, Diw and Dit denote air distances between the $i^{th}$ lens unit and the $(i+1)^{th}$ lens unit at the wide-angle end and the telephoto end, respectively, $\nu N2$ is an average Abbe number of one or more materials of the one or more negative lenses in the second focusing unit, $\nu P2$ is an average Abbe number of one or more materials of the one or more positive lenses in the second focusing unit, $\Delta g=1$ and $\Delta g=2$ respectively represent the state in which a focus position for the g-line for a close distance is shifted from a focus position for the g-line for infinity in a direction from the periphery of a screen to the center thereof and the state in which the focus position for the g-line for the close distance is shifted from the focus position for the g-line for infinity in a direction from the center of the screen to the periphery thereof when focusing is performed from infinity to the close distance with respect to an off-axis object point using only the first focusing unit, and $\Delta X2=1$ and $\Delta X2=2$ respectively represent the state in which the second focusing unit moves from the image side to the object side and the state in which the second focusing unit moves from the object side to the image side during focusing from infinity to the close distance.

5. The zoom lens according to claim 4, wherein the following condition is satisfied:

$0.1 < f3/f3b < 0.5$ where f3 is a focal length of the third lens unit and f3b is a focal length of the third-b lens unit.

6. The zoom lens according to claim 4, wherein the following conditions are satisfied:

$0.7 < |f1|/\sqrt{(fw \times ft)} < 1.2$ (4)

$0.5 < f2/\sqrt{(fw \times ft)} < 1$ (5)

$0.6 < |f3|/\sqrt{(fw \times ft)} < 1$ (6)

where f1, f2, and f3 are focal lengths of the first lens unit, the second lens unit, and the third lens unit, respectively, and fw and ft are focal lengths of the entire system at the wide-angle end and the telephoto end, respectively.

7. The zoom lens according to claim 4, further comprising a fifth lens unit having a negative refractive power which moves during zooming and a sixth lens unit having a positive refractive power which does not move during zooming, the fifth and sixth lens units being disposed on the image side of the fourth lens unit, the fifth lens unit serving as the first focusing unit.

8. The zoom lens according to claim 4, wherein the first lens unit serves as the first focusing unit.

9. The zoom lens according to claim 4, wherein the first lens unit includes a first-a lens unit having a negative refractive power and a first-b lens unit having a negative refractive power, the first-b lens unit serving as the first focusing unit.

10. A zoom lens comprising:

a first lens unit having a negative refractive power;

a second lens unit having a positive refractive power;

a third lens unit having a negative refractive power;

a fourth lens unit having a positive refractive power, wherein the first lens unit, the second lens unit, the third lens unit, and the fourth lens unit are arranged in order from the object side to the image side, wherein the zoom lens performs zooming by changing distances between the first through fourth lens units, wherein the third lens unit includes a third-a lens unit and a third-b lens unit, the third-b lens unit including a positive lens and a negative lens; and a first focusing unit and a second focusing unit which move independently of each other during focusing, the third-b lens unit serving as the second focusing unit, wherein the following conditions are satisfied:

$D1w > D1t$ $D2w < D2t$ $D3w > D3t$ $(-1)^{\Delta X1} \times (-1)^{\Delta h1} \times (\nu N1 - \nu P1) \times (\nu N2 - \nu P2) \times (-1)^{\Delta X2} < 0$ where i denotes the number of each lens unit counted from the object side, Diw and Dit denote air distances between the $i^{th}$ lens unit and the $(i+1)^{th}$ lens unit at the wide-angle end and the telephoto end, respectively, $\Delta X1=1$ and $\Delta X1=2$ respectively represent the state in which the first focusing unit moves from the image side to the object side and the state in which the first focusing unit moves from the object side to the image side during focusing from infinity to a close distance, $\Delta X2=1$ and $\Delta X2=2$ respectively represent the state in which the second focusing unit moves from the image side to the object side and the state in which the second focusing unit moves from the object side to the image side during focusing from infinity to the close distance, $\nu N1$ is an average Abbe number of one or more materials of the one or more negative lenses in the first focusing unit, $\nu P1$ is an average Abbe number of one or more materials of the one or more positive lenses in the first focusing unit, $\nu N2$ is an average Abbe number of one or more materials of the one or more negative lenses in the second focusing unit, $\nu P2$ is an average Abbe number of one or more materials of the one or more positive lenses in the second focusing unit, and $\Delta h1=2$ and $\Delta h1=1$ respectively represent the state in which the first focusing unit and the second focusing unit move in the same direction along an optical axis and the state in which the first focusing unit and the second focusing unit move in the opposite directions along the optical axis.

* * * * *